(12) United States Patent
Kitamura

(10) Patent No.: US 8,681,760 B2
(45) Date of Patent: Mar. 25, 2014

(54) NETWORK POSITIONING SYSTEM AND TERMINAL POSITIONING DEVICE

(75) Inventor: Tomohiko Kitamura, Osaka (JP)

(73) Assignee: Panasonic Corporation, Osaka (JP)

( * ) Notice: Subject to any disclaimer, the term of this patent is extended or adjusted under 35 U.S.C. 154(b) by 202 days.

(21) Appl. No.: 13/203,052

(22) PCT Filed: Aug. 31, 2010

(86) PCT No.: PCT/JP2010/005358
§ 371 (c)(1),
(2), (4) Date: Aug. 24, 2011

(87) PCT Pub. No.: WO2011/077609
PCT Pub. Date: Jun. 30, 2011

(65) Prior Publication Data
US 2011/0305234 A1    Dec. 15, 2011

(30) Foreign Application Priority Data

Dec. 25, 2009   (JP) ................... 2009-295818

(51) Int. Cl.
*H04W 4/00*    (2009.01)

(52) U.S. Cl.
USPC ........................................ 370/338

(58) Field of Classification Search
USPC ........................................ 370/338
See application file for complete search history.

(56) References Cited

U.S. PATENT DOCUMENTS

| | | | | |
|---|---|---|---|---|
| 6,771,662 B1 * | 8/2004 | Miki et al. | ............... | 370/469 |
| 2003/0041238 A1 * | 2/2003 | French et al. | ............... | 713/153 |
| 2006/0056328 A1 * | 3/2006 | Lehane et al. | ............... | 370/315 |
| 2006/0256711 A1 * | 11/2006 | Kusama et al. | ............... | 370/216 |
| 2007/0091838 A1 * | 4/2007 | Kobayashi et al. | ............ | 370/328 |
| 2009/0164786 A1 * | 6/2009 | Sekimoto et al. | ............. | 713/171 |

FOREIGN PATENT DOCUMENTS

| | | |
|---|---|---|
| JP | 2002-84321 | 3/2002 |
| JP | 2003-280975 | 10/2003 |
| JP | 2005-115533 | 4/2005 |
| JP | 2009-141425 | 6/2009 |

OTHER PUBLICATIONS

Yoshinori Azuma et al., "Topology-aware Server Selection Method for Dynamic Parallel Downloading", IEICE Technical Report NS2003-173, vol. 103, No. 443, pp. 19-24, 2003, together with verified English translation.

Yuya Minami et al., "A Proposal of Node Selection Based on Proximity for Peer-to-Peer File Sharing Systems", IPSJ SIG Notes 2002-QAI-2-, vol. 2002, No. 11, pp. 3-9, Feb. 6, 2002, together with verified partial English translation.

Yoshihiro Goto et al., "Methods on Logical Network Construction in Peer-to-Peer Services based on Traffic Measurements", IEICE Technical Report MVE2001-134, vol. 101, No. 638, pp. 43-48, Feb. 1, 2002, together with verified partial English translation.

(Continued)

*Primary Examiner* — Otis L Thompson, Jr.
(74) *Attorney, Agent, or Firm* — Wenderoth, Lind & Ponack, L.L.P.

(57) ABSTRACT

A terminal positioning device receives, from each terminal, network path information listing intermediary device identifiers that identify each intermediary device in the network on the path from the terminal to a path search target device. The terminal positioning device creates, in accordance with the network path information received from each terminal, terminal position information representing connections between routers and connections between routers and the terminals.

13 Claims, 22 Drawing Sheets

(56) References Cited

OTHER PUBLICATIONS

Tagui Ichikawa, "Trends in Content Delivery and P2P Technology", New York Report (IPA), May 2002, together with verified partial English translation.
International Search Report issued Dec. 7, 2010 in International (PCT) Application No. PCT/JP2010/005358.
Yoshinori Higashi et al., "Topology-aware Server Selection Method for Dynamic Parallel Downloading", IEICE Technical Report NS2003-173, vol. 103, pp. 19-24, 2003, together with verified English translation.
Hiroya Minami et al., "A Proposal of Node Selection Based on Proximity for Peer-to-Peer File Sharing Systems", IPSJ SIG Notes 2002-QAI-2-, vol. 2002, No. 11, pp. 3-9, Feb. 6, 2002, together with verified partial English translation.
Satoru Makabe et al., "Dynamic Mirror Server Selection Method with Consideration about Fluctuation of Network Load", the Transactions of the Institute of Electronics, Information and Communication Engineers, vol. J84-B, No. 3, pp. 435-442, Mar. 1, 2001, together with verified English translation.
Yohei Tajima et al., "Optimization for Overlay Network over IPv6", IEICE Technical Report, IN2008-28, vol. 108, No. 136, p. 13-16, Jul. 10, 2008, together with verified English translation.
Yoshihiro Gotou et al., "Methods on Logical Network Construction in Peer-to-Peer Services based on Traffic Measurements", IEICE Technical Report MVE2001-134, vol. 101, No. 638, pp. 43-48, Feb. 1, 2002, together with verified partial English translation.
Tagui Ichikawa, "Trends in Content Delivery and P2P Technology", New York Report (IPA), May 2009, together with verified partial English translation.

* cited by examiner

|   | 501  | 502  | 503  | 504  | 505  | 506  |
|---|------|------|------|------|------|------|
| 1 | R341 | R341 | R344 | R344 | R345 | R345 |
| 2 | R331 | R331 | R332 | R332 | R322 | R322 |
| 3 | R321 | R321 | R321 | R321 | R311 | R311 |
| 4 | R311 | R311 | R311 | R311 | R301 | R301 |
| 5 | R301 | R301 | R301 | R301 |      |      |
|   | L501 | L502 | L503 | L504 | L505 | L506 |

FIG. 20

| | 501 | 502 | 503 | 504 | 505 | 506 | 250 |
|---|---|---|---|---|---|---|---|
| 1 | R341 | R341 | R344 | R344 | R345 | R345 | |
| 2 | R331 | R331 | R332 | R332 | R322 | R322 | |
| 3 | R321 | R321 | R321 | R321 | R311 | R311 | |
| 4 | R311 | R311 | R311 | R311 | R301 | R301 | R301 |
| 5 | R301 | R301 | R301 | R301 | | | |
| | L501 | L502 | L503 | L504 | L505 | L506 | L250 |

NETWORK POSITIONING SYSTEM AND TERMINAL POSITIONING DEVICE

BACKGROUND OF INVENTION

1. Technical Field

The present invention relates to technology for positioning terminals in a network.

2. Background Art

In recent years, delivery over the Internet of large volumes of information and content, such as video content, has begun. A wide variety of content is delivered on the Internet, ranging from textual information to images and movies. The volume of such content continues to increase every year.

To respond to the resulting increase in Internet traffic, Internet Service Providers (ISPs) have been compelled to intensify their physical infrastructure by investing to increase the number of communication lines, servers, etc.

Such investment, however, is extremely expensive. Increased importance is therefore being placed on technology for efficient delivery, particularly of large quantities of data, through effective use of fewer resources.

To address this need for efficient content delivery, Peer to Peer (P2P) technology such as BitTorrent™ or Swarmcast is becoming widespread (for example, see Non-Patent Literature 1, Patent Literature 1, and Patent Literature 2).

P2P refers to a network that establishes a direct connection between computers accessing the Internet. Specifically, P2P makes it possible for a terminal (computer), referred to as a peer, to use the computing ability of another peer connected to the Internet. P2P also enables peers to establish a direct connection over the Internet and exchange information or content.

P2P technology aims to achieve efficient delivery of content by saving part of content used by a participating terminal and providing the content to another terminal, thereby establishing a content delivery network.

CITATION LIST

Patent Literature

Patent Literature 1: Japanese Patent Application Publication No. 2002-084321
Patent Literature 2: Japanese Patent Application Publication No. 2009-141425

Non-Patent Literature

Non-Patent Literature 1: Tagui ICHIKAWA, Content haishin (CDN) gijutsu to P2P gijutsu o meguru doko (Trends in content delivery (CDN) technology and P2P technology), Information Technology Promotion Agency, Japan, May 1, 2009.

SUMMARY OF INVENTION

To reduce network traffic, it is necessary to use a terminal located near the terminal that is the recipient of content (receiving terminal) as the source terminal that delivers the content (delivering terminal). Current P2P technology uses network addresses to select the delivering terminal.

It is difficult, however, to select a terminal on a network that is appropriate for data transfer (i.e. a terminal in the network located near the terminal receiving delivered content) using only network addresses. If a terminal in the network that is appropriate for transfer cannot be selected as the delivering terminal, a different terminal may end up delivering content, thus increasing network traffic.

Therefore, in order to achieve efficient data delivery in the context of delivery of content or the like between terminals in a network, it is an object of the present invention to provide a network positioning system and a terminal positioning device that make it possible to ascertain the position of each terminal in the network.

A network positioning system according to the present invention comprises a plurality of terminals, a terminal positioning device, and a path search target device, the terminal positioning device being configured to position the terminals in a network, a plurality of sub-networks being connected hierarchically in the network and each having an intermediary device, and the path search target device being connected to any of the intermediary devices, wherein the terminal positioning device includes: a path information reception unit configured to receive, from each terminal, path information listing intermediary device identifiers that identify each intermediary device in the network on a path from the corresponding terminal to the path search target device; and a terminal position information creation unit configured to create, based on the path information received from each terminal, terminal position information representing relations of connection between the intermediary devices and relations of connection between the intermediary devices and the terminals.

In the above network positioning system, the terminal positioning device receives, from each of the plurality of terminals, network path information for the path from the terminal to the path search target device and creates, from the received network path information, terminal position information indicating the position in the network of each terminal. This structure makes it possible to ascertain the position of each terminal in the network in order, for example, to achieve efficient data delivery.

The above network positioning system may further comprise a delivery management device configured to select, from among the terminals, based on the terminal position information created by the terminal position information creation unit, a transmission terminal to transmit data or a reception terminal to receive data when data is to be transmitted between any of the terminals.

With the above structure, data transfer between terminals can be made to meet a variety of demands by using the terminal position information.

In the above network positioning system, the delivery management device may select a terminal located close in the network to a terminal attempting to receive data as the transmission terminal or selects a terminal located close in the network to a terminal attempting to transmit data as the reception terminal.

The above structure effectively reduces traffic in the network since data is transmitted and received between terminals that are close to each other on the network.

In the above network positioning system the delivery management device may select a terminal located far in the network from a terminal attempting to receive data as the transmission terminal or selects a terminal located far in the network from a terminal attempting to transmit data as the reception terminal.

The above structure enables terminals that are located far from each other in the network to hold the same data, thus reducing the probability of loss of data during a fire, a natural disaster, etc.

In the above network positioning system, the delivery management device may include: a data list storage unit for storing a data list listing one or more data identifiers that each identify a piece of data stored by the terminals; a transmission terminal selection unit configured to select, based on the terminal position information created by the terminal position information creation unit and the data list stored by the data list storage unit, the transmission terminal from among terminals in the network that store data a terminal is attempting to receive; and a transmission terminal notification unit configured to notify the terminal attempting to receive data of the transmission terminal selected by the transmission terminal selection unit.

With the above structure, data transfer between terminals can be made to meet a variety of demands since the transmission terminal is selected from among terminals storing the data that a terminal is attempting to receive.

The above network positioning system may further comprise a data providing device configured to initially provide data to one or more terminals among the plurality of terminals.

The above structure makes data transfer between terminals possible.

The above network positioning system may further comprise a data providing device configured to provide data to a terminal in the network attempting to receive the data.

With the above structure, terminals receive desired data from the data providing device.

The above network positioning system may further comprise one or more dedicated transmission terminals other than the plurality of terminals and configured only to transmit data; and a terminal management device configured to manage an operational status of the dedicated transmission terminals.

The above structure allows for an increase in the number of terminals that transmit data by providing dedicated transmission terminals, thus making efficient data transfer possible.

In the above network positioning system, the terminal management device may cause the dedicated transmission terminals to operate continually.

With the above structure, dedicated transmission terminals operate continually, thus making efficient data transfer possible.

In the above network positioning system, the terminal management device may cause the dedicated transmission terminals to operate in accordance with time management.

With the above structure, power consumption is reduced while making efficient data transfer possible by, for example, causing the dedicated transmission terminals to operate only at necessary times.

In the above network positioning system, the terminal management device may cause the dedicated transmission terminals to operate in accordance with a data transfer load.

With the above structure, power consumption is reduced while making efficient data transfer possible by, for example, causing the dedicated transmission terminals to operate only when the data transfer load is large.

In the above network positioning system, the dedicated transmission terminals may transmit data in accordance with a data delivery method.

The above structure allows the dedicated transmission terminals to operate, for example, in accordance with the data delivery method of a data deliverer.

In the above network positioning system, the terminal positioning device may further include: an inter-terminal path information acquisition unit configured (i) to specify, within the terminal position information created by the terminal position information creation unit, one or more terminals connected to the same intermediary device as a terminal group, (ii) to acquire, for each terminal group, inter-terminal path information listing intermediary device identifiers that identify each intermediary device on a path from a terminal to another terminal in the same terminal group, and (iii) to acquire, for each combination of different terminal groups, inter-terminal path information listing intermediary device identifiers that identify each intermediary device on a path from a terminal to another terminal respectively included in the different terminal groups; and a terminal position information adjustment unit configured to adjust terminal position information created by the terminal position information creation unit in accordance with the inter-terminal path information by removing, from the terminal position information, an intermediary device identifier identifying an intermediary device that does not transfer data by returning the data.

This structure makes it possible to more accurately ascertain the position of each terminal in the network in order, for example, to achieve efficient data delivery.

A terminal positioning device according to the present invention is for positioning a plurality of terminals connected to a network, a plurality of sub-networks being connected hierarchically in the network and each having an intermediary device, and a path search target device being connected to any of the intermediary devices, the terminal positioning device comprising: a path information reception unit configured to receive, from each terminal, path information listing intermediary device identifiers that identify each intermediary device in the network on a path from the corresponding terminal to the path search target device; and a terminal position information creation unit configured to create, based on the path information received from each terminal, terminal position information representing relations of connection between the intermediary devices and relations of connection between the intermediary devices and the terminals.

The above terminal positioning device receives, from each of the plurality of terminals, network path information for the path from the terminal to the path search target device and creates, from the received network path information, terminal position information indicating the position in the network of each terminal. This structure makes it possible to ascertain the position of each terminal in the network in order, for example, to achieve efficient data delivery.

The above terminal positioning device may further comprise an inter-terminal path information acquisition unit configured (i) to specify, in the terminal position information created by the terminal position information creation unit, one or more terminals connected to the same intermediary device as a terminal group, (ii) to acquire, for each terminal group, inter-terminal path information listing intermediary device identifiers that identify each intermediary device on a path from a terminal to another terminal in the same terminal group, and (iii) to acquire, for each combination of different terminal groups, inter-terminal path information listing intermediary device identifiers that identify each intermediary device on a path from a terminal to another terminal respectively included in the different terminal groups; and a terminal position information adjustment unit configured to adjust terminal position information created by the terminal position information creation unit in accordance with the inter-terminal path information, acquired by the inter-terminal path information acquisition unit, by removing, from the terminal position information, an intermediary device identifier identifying an intermediary device that does not transfer data by returning the data.

This structure makes it possible to more accurately ascertain the position of each terminal in the network in order, for example, to achieve efficient data delivery.

BRIEF DESCRIPTION OF DRAWINGS

FIG. 20 shows an example of a path information table within a terminal positioning device in FIG. 19.

DETAILED DESCRIPTION OF INVENTION

Embodiment 1

The following describes Embodiment 1 of the present invention with reference to the drawings.

<Structure of Network Positioning System>

Figure 1:
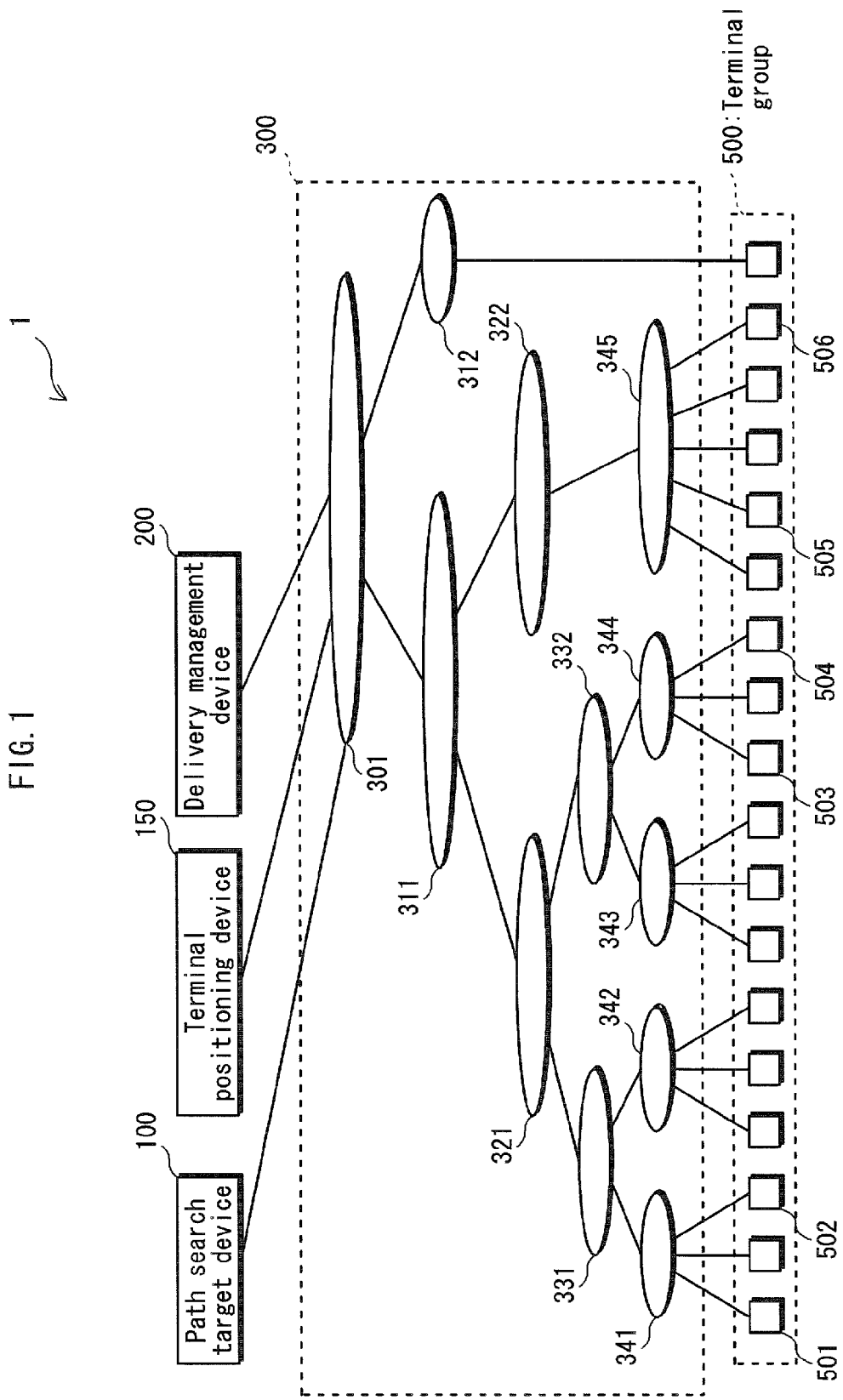
FIG. 1 is a structural diagram of a network positioning system according to Embodiment 1.
Figure 2:
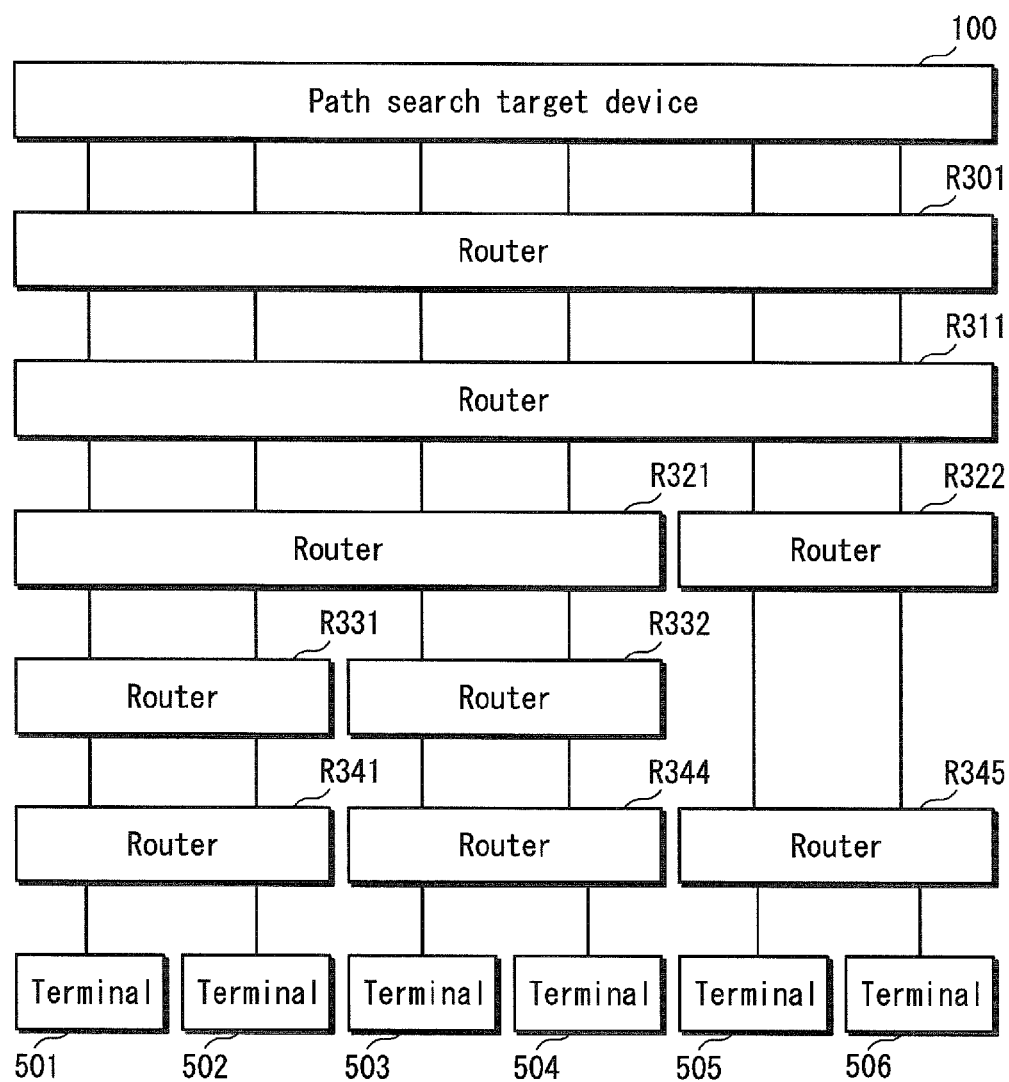
FIG. 2 shows a network path for part of FIG. 1.

FIG. 1 shows the structure of the network positioning system according to Embodiment 1, and FIG. 2 shows a network path for part of FIG. 1.

The network positioning system 1 in FIG. 1 includes a path search target device 100, a terminal positioning device 150, a delivery management device 200, a network 300, and a terminal group 500. In the present Embodiment, terminals 501-506 within the terminal group 500 are recipients and deliverers of data. Note that the number of terminals that are recipients or deliverers of data is not limited in any particular way.

The path search target device 100 is a device used as the target of a Linux™ traceroute command executed by the terminals 501-506 within the terminal group 500 in order to acquire network path information.

The terminal positioning device 150 receives, from each of the terminals 501-506, network path information that lists information (hereinafter, "router identifier") indicating the routers from the terminal to the path search target device 100 in order from the terminal The terminal positioning device 150 also uses the network path information received from each of the terminals 501-506 to create terminal position information indicating the position of each of the terminals 501-506 in the network.

The delivery management device 200 receives the terminal position information from the terminal positioning device 150 and uses the received terminal position information to select, from among terminals that store data (hereinafter, "requested delivery data") that a terminal (hereinafter, "data reception terminal") is attempting to receive, the terminal that is located closest in the network to the data reception terminal to be a terminal (hereinafter, "data transmission terminal") that transmits the requested delivery data to the data reception terminal. The delivery management device 200 also notifies the data reception terminal of the data transmission terminal.

In the example in FIG. 1, the network 300 is a hierarchically structured network having sub-networks 301, 311-312, 321-322, 331-332, and 341-345. In the example in FIG. 1, the path search target device 100, the terminal positioning device 150, and the delivery management device 200 are connected to the network 301. The terminals 501 and 502 are connected to the network 341, the terminals 503 and 504 are connected to the network 344, and the terminals 505 and 506 are connected to the network 345.

Routers R301, R311, R321-R322, R331-R332, R341, R344, and R345 in FIG. 2 are routers in the networks 301, 311, 321-322, 331-332, 341, 344, and 345 in FIG. 1. In this context, intermediary devices in the network are considered to be routers, but the present invention is not limited in this way. The intermediary devices may be gateways or the like.

The terminals 501-506 in the terminal group 500 each execute a traceroute command to create the network path information for the path from the terminal to the path search target device 100. Each of the terminals 501-506 then transmits, to the terminal positioning device 150, a path information notification packet that includes identifying information on the terminal and the network path information. Note that hereinafter, information identifying a terminal is referred to as a "terminal identifier".

The terminals 501-506 each transmit, to the delivery management device 200, a data list notification packet that includes a terminal identifier indicating the terminal and a data list that lists information (data identifiers) indicating the data stored by the terminal. Note that hereinafter, the data stored by the terminal is also referred to as "stored data".

Furthermore, the terminals 501-506 transmit, to the delivery management device 200, a transmission terminal notification request packet that includes the terminal identifier indicating the terminal issuing the transmission terminal notification request packet (data reception terminal) and the data identifier indicating the data (requested delivery data) that the data reception terminal is attempting to receive. As a response, the terminals 501-506 receive a transmission terminal notification packet that includes the terminal identifier indicating the data transmission terminal The terminals 501-506 transmit, to the data transmission terminal of the terminal identifier included in the transmission terminal notification packet, a data transmission request packet that includes the data identifier indicating the requested delivery data. The terminals 501-506 then receive the requested delivery data from the data transmission terminal.

The terminals 501-506 also receive, from another terminal, the data transmission request packet that includes the data identifier indicating the requested delivery data. The terminals 501-506 then transmit the requested delivery data to the other terminal.

For the sake of convenience, in the following explanation the same number as the corresponding reference sign is used to identify each of the terminals, routers, and devices. While an IP address may be used for identification of the terminals, routers, and devices, identification is not limited in this way.

[Structure of Terminal Positioning Device]

Figures 3, 4:
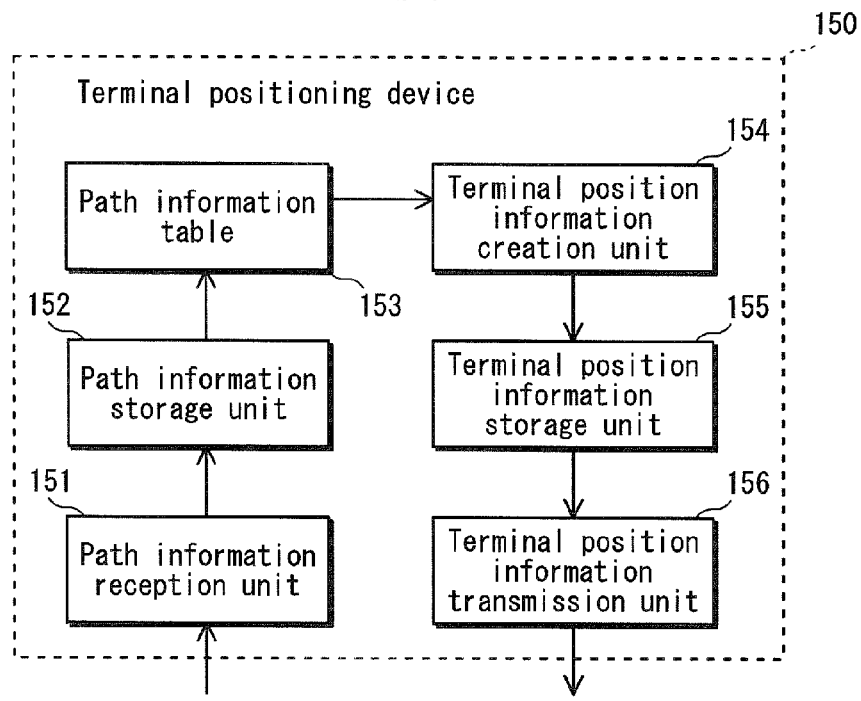
FIG. 3 is a structural diagram of a terminal positioning device in FIG. 1.
FIG. 4 shows an example of a path information table in FIG. 3.

FIG. 3 is a structural diagram of the terminal positioning device 150 in FIG. 1. The terminal positioning device 150 is provided with a path information reception unit 151, a path information storage unit 152, a path information table 153, a terminal position information creation unit 154, a terminal position information storage unit 155, and a terminal position information transmission unit 156.

The path information reception unit 151 receives, from each of the terminals 501-506, the above-described path information notification packet for indicating the network path information. The path information reception unit 151 then transmits, to the path information storage unit 152, (i) the terminal identifier indicating the corresponding one of the terminals 501-506 and (ii) the network path information for the path from the corresponding terminal to the path search target device 100, the information in (i) and (ii) being included in the path information notification packet. The path information storage unit 152 stores, in the path information table 153, the network path information for the path from each of the terminals 501-506 to the path search target device 100 in association with the terminal identifier indicating the corresponding terminal. The path information table 153 is stored on a storage device such as a semiconductor memory or a Hard Disk Drive (HDD). FIG. 4 shows an example of the path information table 153. In the example of the path information table 153 shown in FIG. 4, pieces of network path information L501-L506 for the path from the terminal to the path search target device 100 are stored in association with the terminal identifier for the corresponding one of the terminals 501-506. For example, the network path information L501 corresponding to the terminal identifier for the terminal 501 lists router identifiers indicating the routers R341, R331, R321, R311, and R301 in this order of proximity to the terminal 501.

From the path information table 153, the terminal position information creation unit 154 searches for the router identifier for the same router in different pieces of network path information that correspond to the terminals 501-506, for example. The terminal position information creation unit 154 then creates terminal position information indicating the position of each of the terminals 501-506 in the network and stores the created terminal position information in the terminal position information storage unit 155. In this context, the terminal position information represents the relation of connection between routers, and the relation of connection between routers and terminals. The inter-positional relationship of terminals in the network is clear from the terminal position information.

Figure 5:
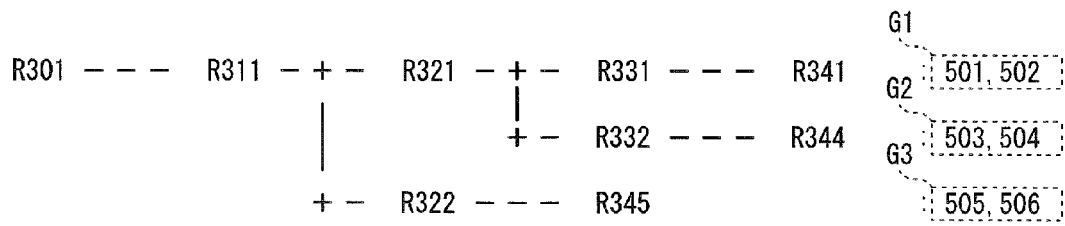
FIG. 5 shows terminal position information created from the path information table in FIG. 4.

The terminal position information storage unit 155 is a storage device, such as a semiconductor memory or a HDD, for storing the terminal position information, an example of which is shown in FIG. 5. The terminal position information shown in FIG. 5 is created by the terminal position information creation unit 154 from the path information table 153 shown in FIG. 4. Note that in the terminal position information in FIG. 5, the terminals 501 and 502 which are connected to the router R341 belong to terminal group G1, the terminals 503 and 504 which are connected to the router R344 belong to terminal group G2, and the terminals 505 and 506 which are connected to the router R345 belong to terminal group G3.

The terminal position information transmission unit 156 transmits, to the delivery management device 200, a terminal position notification packet that includes the terminal position information stored in the terminal position information storage unit 155.

[Structure of Delivery Management Device]

Figure 6:
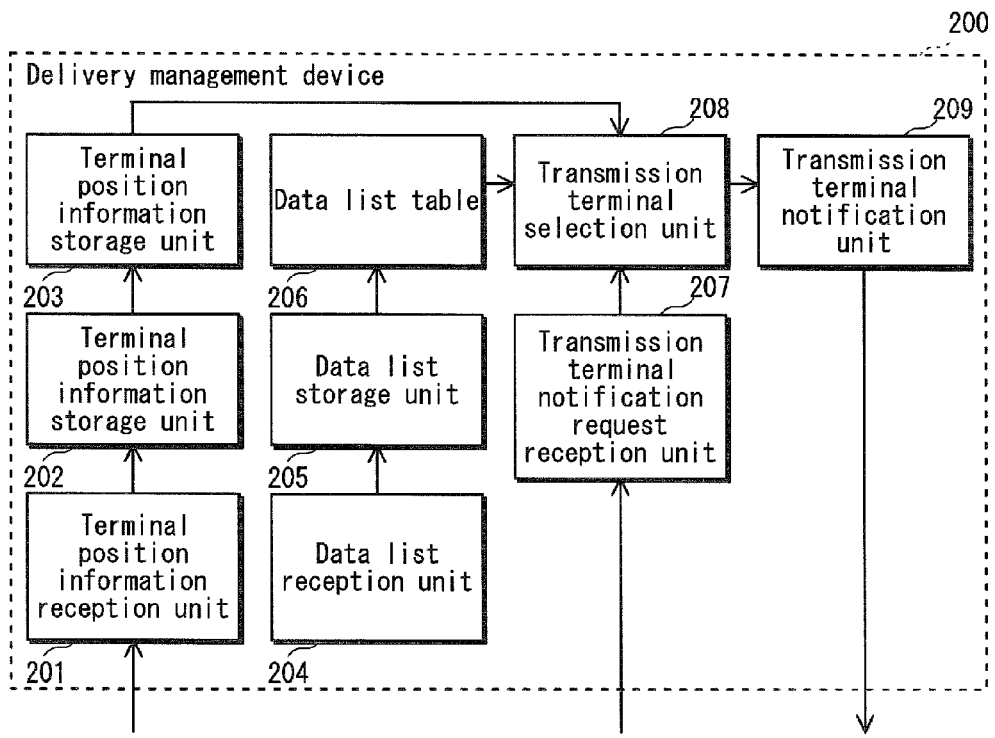
FIG. 6 is a structural diagram of a delivery management device in FIG. 1.

FIG. 6 is a structural diagram of the delivery management device 200 in FIG. 1. The delivery management device 200 is provided with a terminal position information reception unit 201, a terminal position information storage unit 202, a terminal position information storage unit 203, a data list reception unit 204, a data list storage unit 205, a data list table 206, a transmission terminal notification request reception unit 207, a transmission terminal selection unit 208, and a transmission terminal notification unit 209.

The terminal position information reception unit 201 receives, from the terminal position information transmission unit 156 in the terminal positioning device 150, a terminal position notification packet including the terminal position information and transmits the terminal position information to the terminal position information storage unit 202. The terminal position information storage unit 202 stores the terminal position information received from the terminal position information reception unit 201 in the terminal position information storage unit 203. The terminal position information storage unit 203 is a storage device, such as a semiconductor memory or a HDD, for storing the terminal position information. The same terminal position information stored in the terminal position information storage unit 155 of the terminal positioning device 150 as shown in the example in FIG. 5 is stored in the terminal position information storage unit 203.

The data list reception unit 204 receives, from each of the terminals 501-506, the above-described data list notification packet for indicating the stored data. The data list reception unit 204 then transmits, to the data list storage unit 205, (i) the terminal identifier indicating the corresponding one of the terminals 501-506 and (ii) the data list that lists the data identifiers indicating the data stored by the corresponding terminal, the information in (i) and (ii) being included in the data list notification packet. The data list storage unit 205 stores the data list for each of the terminals 501-506 in the data list table 206 in association with the terminal identifier for the corresponding terminal The data list table 206 is stored on a storage device, such as a semiconductor memory or a HDD. The data list table 206 stores, for each of the terminals

501-506, the data list that lists the data identifiers indicating the data stored by the terminal in association with the terminal identifier for the terminal.

The transmission terminal notification request reception unit 207 receives the above-described transmission terminal notification request packet from the terminals 501-506 for requesting notification of the data transmission terminal and transmits, to the transmission terminal selection unit 208, (i) the terminal identifier indicating the terminal (data reception terminal) issuing the transmission terminal notification request packet and (ii) the data identifier indicating the requested delivery data, the information in (i) and (ii) being included in the received transmission terminal notification request packet.

The transmission terminal selection unit 208 searches for terminals storing the requested delivery data in the received data identifier by referring to the data list stored in the data list table 206 for each terminal The transmission terminal selection unit 208 then identifies, among the found terminals, the terminal located closest in the network to the data reception terminal by referring to the terminal position information stored in the terminal position information storage unit 203, selecting the closest terminal as the data transmission terminal. The transmission terminal selection unit 208 transmits the terminal identifier for the data reception terminal and the terminal identifier for the data transmission terminal to the transmission terminal notification unit 209.

In this context, the terminal located closest in the network to the data reception terminal refers to the terminal having the smallest number of routers along the path to the data reception terminal in the terminal position information. For example, if the terminal 501 is the data reception terminal, and the terminals 503 and 505 store the requested delivery data, the terminal located closest in the network to the terminal 501 is the terminal 503.

The transmission terminal notification unit 209 transmits, to the data reception terminal, a transmission terminal notification packet that includes the terminal identifier indicating the data transmission terminal selected by the transmission terminal selection unit 208.

<Operations of Network Positioning System>
[Operations to Acquire Network Path Information]

Figure 7:
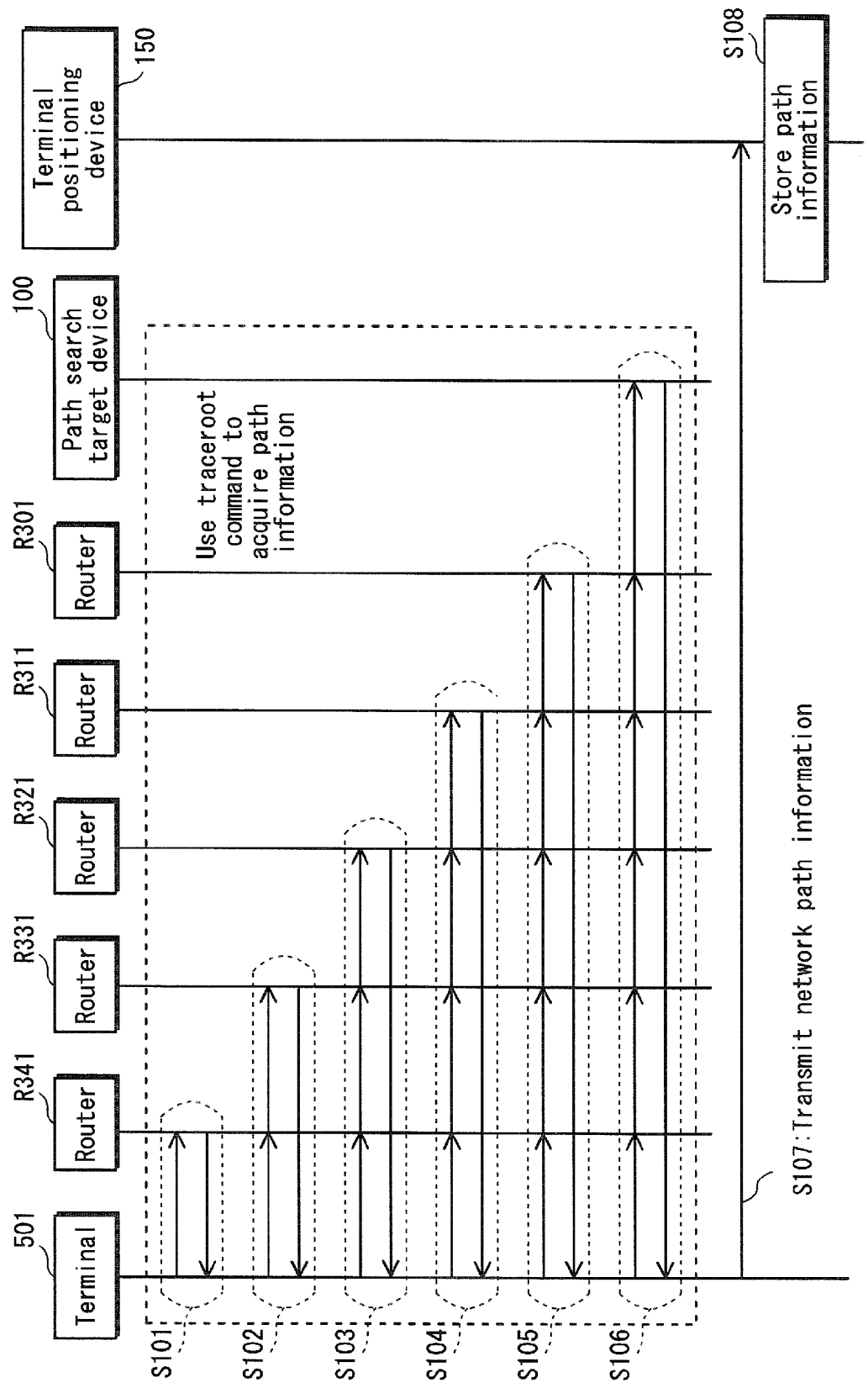
FIG. 7 is an example of an operational sequence relating to operations within the network positioning system of FIG. 1 for acquisition of network path information.

FIG. 7 is an example of an operational sequence relating to operations within the network positioning system 1 of FIG. 1 for acquisition of the network path information. In the example of the operational sequence in FIG. 7, the terminal 501 in FIG. 1 executes a traceroute command to acquire the network path information for the path to the path search target device 100 and transmits the acquired network path information to the terminal positioning device 150. Note that the explanation of the operational sequence in FIG. 7 can be applied to operations for acquiring the network path information for the terminals 502-506, taking into account that the routers between the terminals 502-506 and the path search target device 100 differ.

The terminal 501 executes a traceroute command and transmits a packet whose TTL (Time To Live) equals one to the path search target device 100. The router R341 receives the packet and decrements the value of the TTL by one. Since the TTL now equals zero, the router R341 discards the packet and returns an ICMP Time Exceeded packet (hereinafter, "error response packet") that includes the router identifier for the router R341 to the terminal 501. The terminal 501 receives the error response packet and acquires the router identifier (such as the IP address) for the router R341 (step S101).

Next, the terminal 501 transmits a packet whose TTL equals two to the path search target device 100. The router R341 receives the packet and decrements the value of the TTL by one. Since the TTL does not equal zero, the router R341 forwards the packet whose TTL now equals one. The router R331 receives the packet whose TTL equals one and decrements the value of the TTL by one. Since the TTL now equals zero, the router R331 discards the packet and returns an error response packet that includes the router identifier for the router R331 to the terminal 501. The terminal 501 receives the error response packet and acquires the router identifier for the router R331 (step S102).

Next, the terminal 501 transmits a packet whose TTL equals three to the path search target device 100. The routers R341 and R331 forward the received packet while decrementing the value of the TTL by one. The router R321 receives the packet whose TTL equals one and decrements the value of the TTL by one. Since the TTL now equals zero, the router R321 discards the packet and returns an error response packet that includes the router identifier for the router R321 to the terminal 501. The terminal 501 receives the error response packet and acquires the router identifier for the router R321 (step S103).

Next, the terminal 501 transmits a packet whose TTL equals four to the path search target device 100. The routers R341, R331, and R321 forward the received packet while decrementing the value of the TTL by one. The router R311 receives the packet whose TTL equals one and decrements the value of the TTL by one. Since the TTL now equals zero, the router R311 discards the packet and returns an error response packet that includes the router identifier for the router R311 to the terminal 501. The terminal 501 receives the error response packet and acquires the router identifier for the router R311 (step S104).

Next, the terminal 501 transmits a packet whose TTL equals five to the path search target device 100. The routers R341, R331, R321, and R311 forward the received packet while decrementing the value of the TTL by one. The router R301 receives the packet whose TTL equals one and decrements the value of the TTL by one. Since the TTL now equals zero, the router R301 discards the packet and returns an error response packet that includes the router identifier for the router R301 to the terminal 501. The terminal 501 receives the error response packet and acquires the router identifier for the router R301 (step S105).

Next, the terminal 501 transmits a packet whose TTL equals six to the path search target device 100. The routers R341, R331, R321, R311, and R301 forward the received packet while decrementing the value of the TTL by one. The path search target device 100 receives the packet whose TTL equals one and decrements the value of the TTL by one. Since the TTL now equals zero, the path search target device 100 discards the packet and returns an Echo Reply packet (hereinafter "arrival response packet") to the terminal 501. The terminal 501 receives this arrival response packet (step S106). The terminal 501 thus completes acquisition, via the traceroute command, of the network path information for the path from the terminal 501 to the path search target device 100.

With the path information acquired by executing the traceroute command, the terminal 501 creates the network path information for the path from the terminal 501 to the path search target device 100 and transmits, to the terminal positioning device 150, the path information notification packet that includes the terminal identifier indicating the terminal 501 and the network path information (step S107). In the terminal positioning device 150, the path information reception unit 151 receives the path information notification packet, and the path information storage unit 152 stores, in the path information table 153, the network path information for the path from the terminal 501 to the path search target device 100 in association with the terminal identifier indicating the terminal 501 (step S108).

The path information table 153 thus stores network path information L501 in association with the terminal identifier indicating the terminal 501 (see FIG. 4).

Note that when power to the terminal 501 is turned on, the terminal 501 executes the traceroute command to create the network path information and transmits the created network path information. The terminal 501 also executes the traceroute command to create the network path information and transmits the created network path information at predetermined intervals. When the terminal positioning device 150 requests the network path information from any of the terminals 501-506, the terminal executes the traceroute command to create the network path information and transmits the created network path information. The above cases are simply examples, and the present invention is not limited in this way.

[Operations to Create Terminal Position Information]

Figure 8:
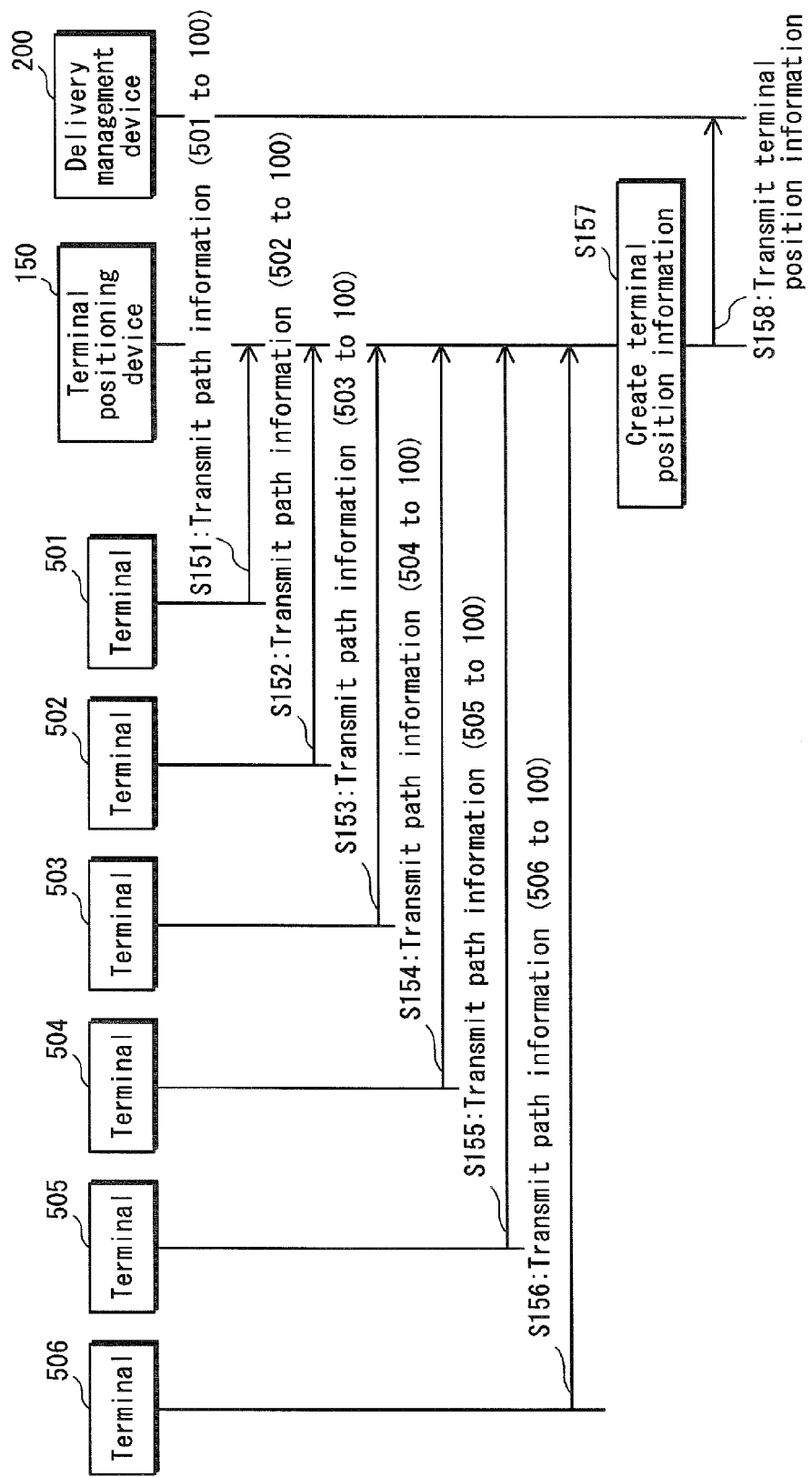
FIG. 8 is an example of an operational sequence relating to operations within the network positioning system of FIG. 1 for creation of terminal position information.

FIG. 8 is an example of an operational sequence relating to operations within the network positioning system 1 of FIG. 1 for creation of the terminal position information.

The terminals 501-506 each execute a traceroute command to create the network path information for the path from the terminal to the path search target device 100. Each of the terminals 501-506 then transmits, to the terminal positioning device 150, the path information notification packet that includes the terminal identifier indicating the terminal and the network path information. In the terminal positioning device 150, the path information reception unit 151 receives the path information notification packets from the terminals 501-506, and the path information storage unit 152 stores, in the path information table 153, the pieces of network path information created by the terminals 501-506 in association with the terminal identifiers indicating the respective terminals (steps S151-S156). Note that the "path information (A to 100)" in steps S151-S156 represents the network path information for the path from terminal A to the path search target device 100.

In the terminal positioning device 150, the terminal position information creation unit 154 creates terminal position information indicating the position of the terminals 501-506 in the network shown in FIG. 5 from the path information table 153 shown in FIG. 4, storing the created terminal position information in the terminal position information storage unit 155 (step S157).

In the terminal positioning device 150, the terminal position information transmission unit 156 transmits a terminal position notification packet that includes the terminal position information stored in the terminal position information storage unit 155 to the delivery management device 200. In the delivery management device 200, the terminal position information reception unit 201 receives the terminal position notification packet from the terminal positioning device 150, and the terminal position information storage unit 202 stores the terminal position information in the terminal position information storage unit 203 (step S158).

[Operations to Create Data List Table]

Figure 9:
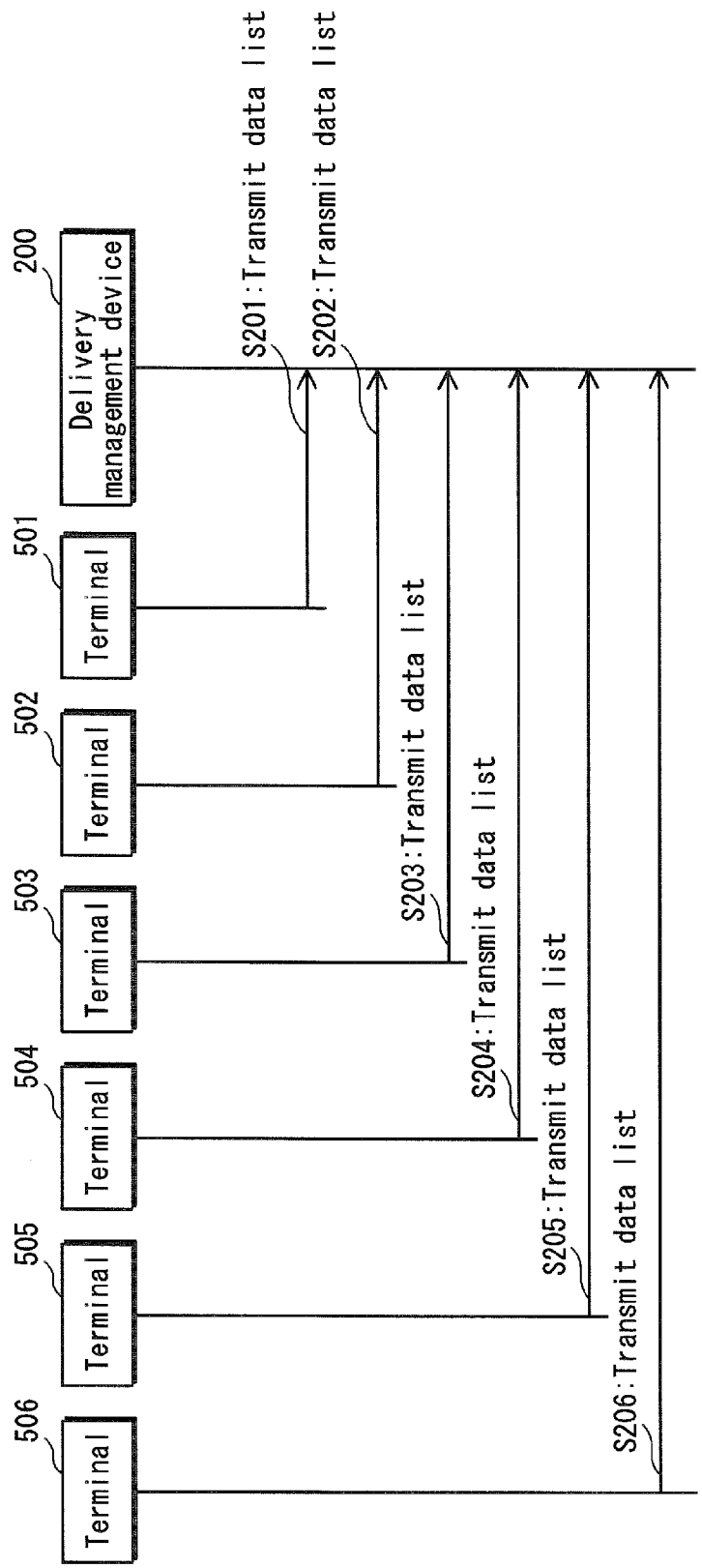
FIG. 9 is an example of an operational sequence relating to operations within the network positioning system of FIG. 1 for creation of a data list table.

FIG. 9 is an example of an operational sequence relating to operations within the network positioning system 1 of FIG. 1 for creation of the data list table.

The terminals 501-506 each transmit, to the delivery management device 200, the data list notification packet that includes the terminal identifier indicating the terminal and the data list that lists the data identifier indicating the data stored by the terminal In the delivery management device 200, the data list reception unit 204 receives the data list notification packets from the terminals 501-506, and the data list storage unit 205 stores the data lists received from the terminals 501-506 in association respectively with the terminal identifiers indicating the terminals 501-506 (steps S201-S206).

Note that each of the terminals 501-506 transmits the table list information when power is turned on the terminal The terminals 501-506 also transmit the data list at predetermined intervals. The terminals 501-506 also transmit the data list upon a request for the data list from the delivery management device 200. The above cases are simply examples, and the present invention is not limited in this way.

<Operations for Data Delivery>

Figure 10:
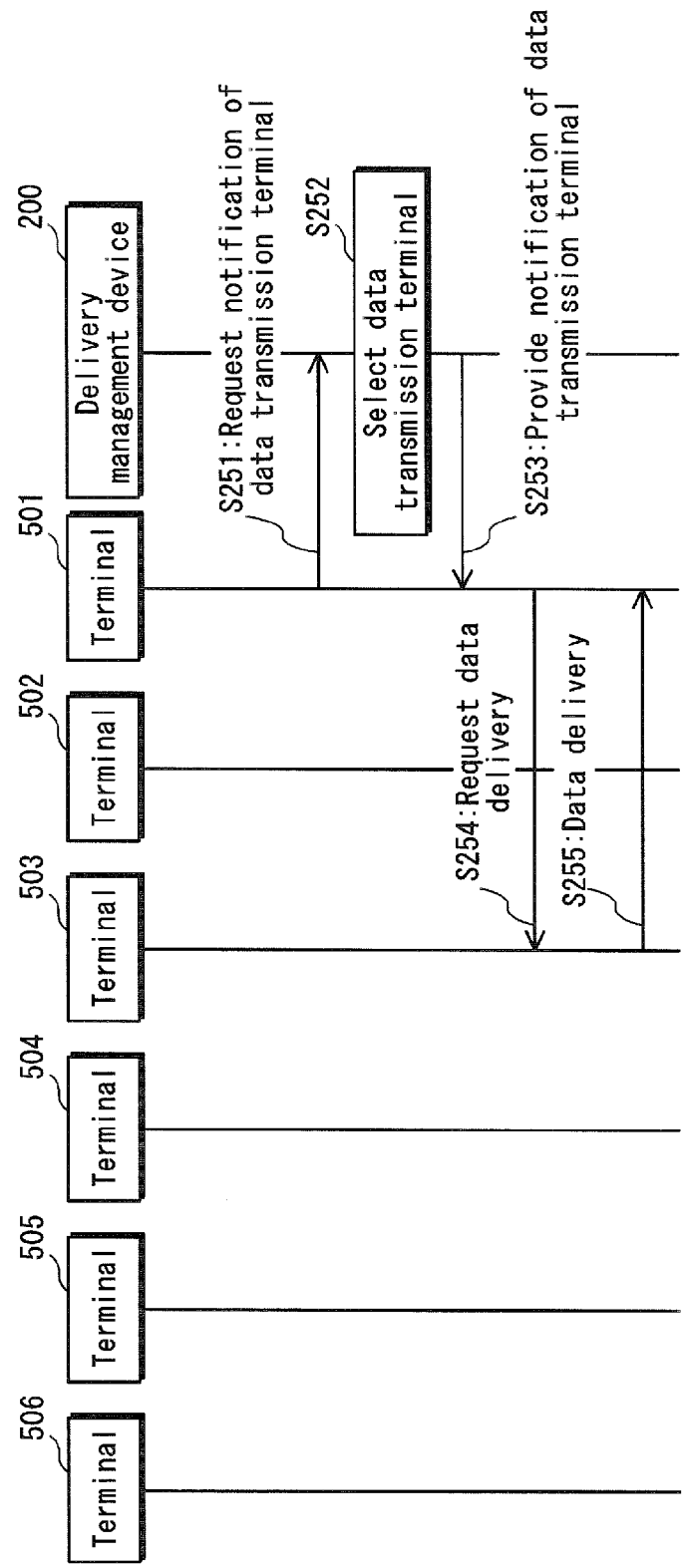
FIG. 10 is an example of an operational sequence relating to operations within the network positioning system of FIG. 1 for data delivery.

FIG. 10 is an example of an operational sequence relating to operations within the network positioning system 1 of FIG. 1 for data delivery. In FIG. 10, the terminal receiving data delivery (data reception terminal) is terminal 501, and terminals 503 and 505 store the data (requested delivery data) which terminal 501 is attempting to receive.

The terminal 501 transmits, to the delivery management device 200, the transmission terminal notification request packet for requesting notification of the data transmission terminal, the transmission terminal notification request packet including the terminal identifier, which indicates the terminal 501 (the data reception terminal), and the data identifier, which indicates the requested delivery data (step S251). In the delivery management device 200, the transmission terminal notification request reception unit 207 receives the transmission terminal notification request packet from the terminal 501. The transmission terminal selection unit 208 searches for terminals storing the requested delivery data indicated by the data identifier included in the transmission terminal notification request packet by referring to the data list table 206, thus finding the terminals 503 and 505. The transmission terminal selection unit 208 then identifies, between terminals 503 and 505, the terminal located closest in the network to the terminal 501 (the data reception terminal) by referring to the terminal position information stored in the terminal position information storage unit 203. The transmission terminal selection unit 208 thus selects terminal 503, which is positioned the closest in the network, as the data transmission terminal (step S252). The transmission terminal notification unit 209 transmits the transmission terminal notification packet that includes the terminal identifier, which indicates the terminal 503, to the terminal 501 (step S253).

The terminal 501 receives the transmission terminal notification packet from the delivery management device 200. The terminal 501 then transmits to the terminal 503, as indicated in the terminal identifier included in the transmission terminal notification packet, the data transmission request packet for requesting delivery of the requested delivery data, the data transmission request packet that includes the data identifier indicating the requested delivery data (step S254). The terminal 503 receives the data transmission request packet and transmits the requested delivery data indicated by the data identifier included in the data transmission request packet to the terminal 501. The terminal 501 receives the requested delivery data from the terminal 503 (step S255).

With the above structure, the data reception terminal receives delivery of data from a data transmission terminal with few intervening routers, thereby effectively reducing network traffic and achieving efficient data transfer.

Embodiment 2

The following describes Embodiment 2 of the present invention with reference to the drawings.

Types of routers include (i) routers provided with a function (hereinafter, a "return function") whereby, when terminal devices connected at a lower network level transmit and receive information, the router forwards data by returning the data back down to the lower network level without forwarding the data to a higher network level, and (ii) routers that do not have such a return function. Embodiment 1 does not take into account these two types of routers when positioning terminals in the network. Embodiment 2, on the other hand, positions terminals in the network taking into account both types of routers.

In Embodiment 2, for the sake of convenience, the same reference signs as in Embodiment 1 are used for the network and for the routers. Other constituent elements bear the same reference signs as constituent elements that are substantially the same in Embodiment 1, and since the description thereof applies in Embodiment 2 as well, such description is either omitted or kept brief.

<Structure of Network Positioning System>

Figure 11:
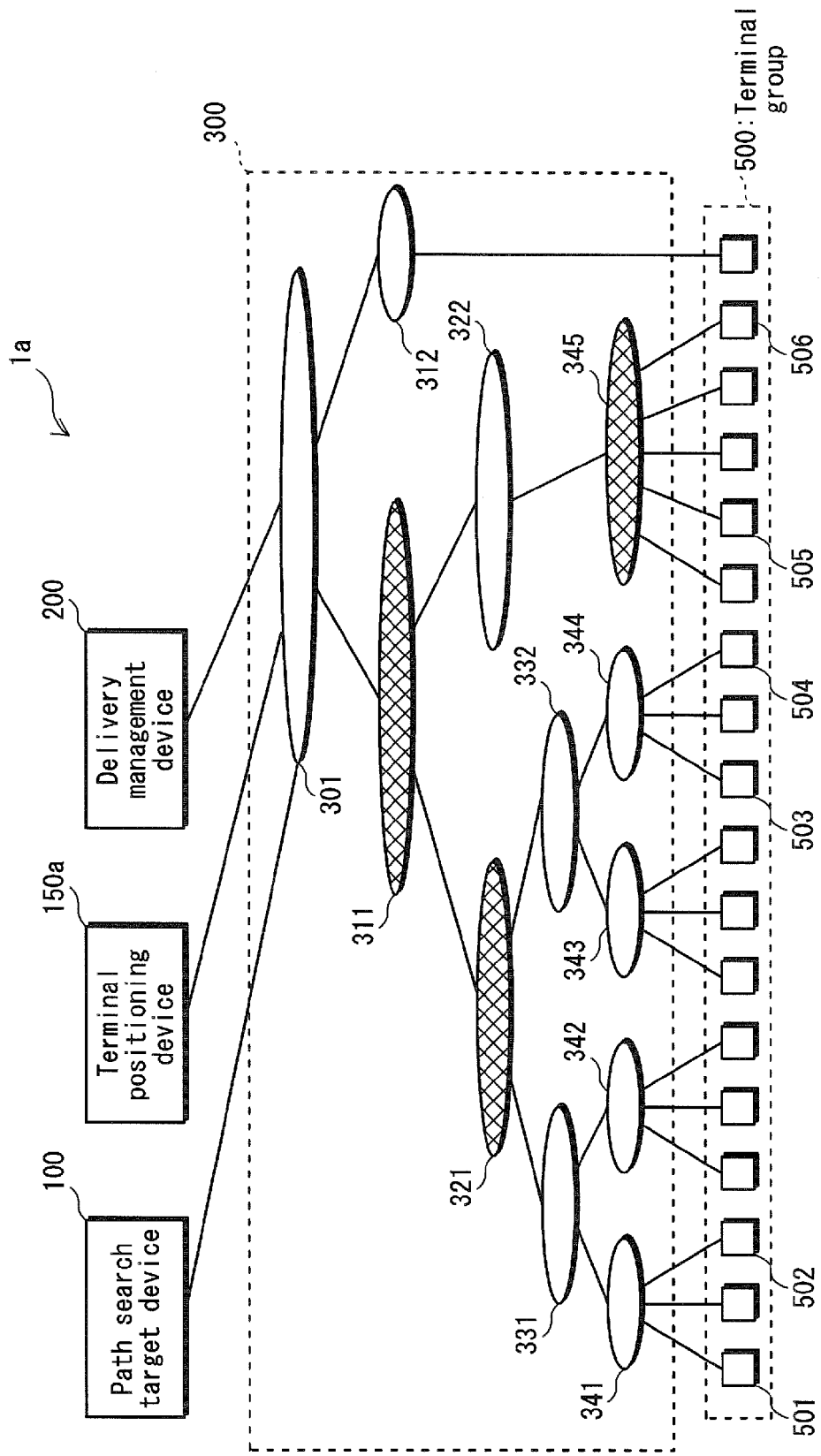
FIG. 11 is a structural diagram of a network positioning system according to Embodiment 2.
Figure 12:
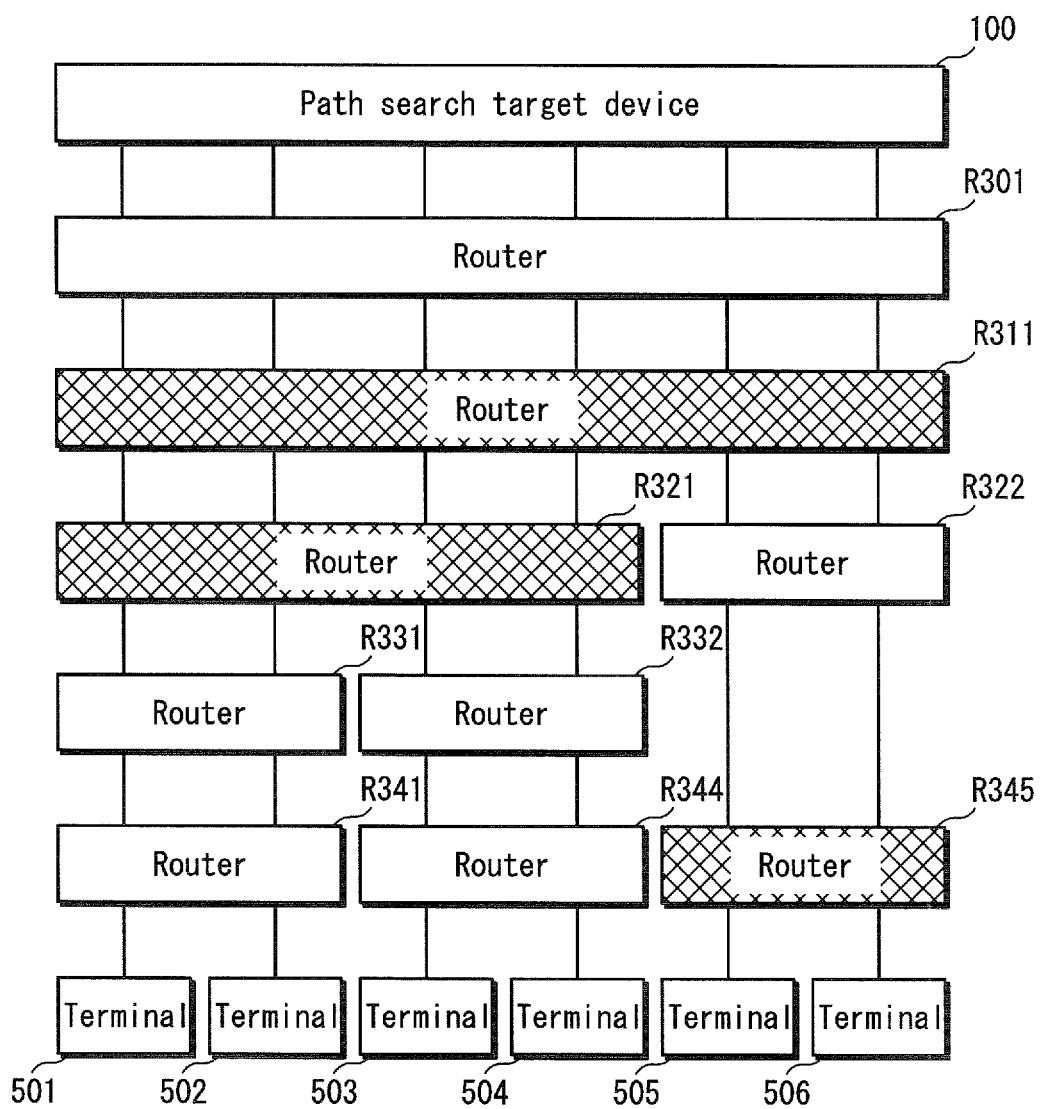
FIG. 12 shows a network path for part of FIG. 11.

FIG. 11 is a structural diagram of a network positioning system 1a according to Embodiment 2, and FIG. 12 shows part of a network path in FIG. 11.

The network positioning system 1a in FIG. 11 includes a path search target device 100, a terminal positioning device 150a, a delivery management device 200, a network 300, and a terminal group 500. In the present Embodiment, terminals 501-506 within the terminal group 500 are recipients and deliverers of data. Note that the number of terminals that are recipients or deliverers of data is not limited in any particular way.

The routers in the networks 311, 321, and 345, shown with hatching in FIG. 11, have the above-described return function, whereas the routers in the other networks do not have the return function. The routers R311, R321, and R345, shown with hatching in FIG. 12, have the above-described return function, whereas the other routers do not have the return function.

In addition to the operations of the terminal positioning device 150 described in Embodiment 1, the terminal positioning device 150a performs the following operations. The terminal positioning device 150a adjusts the terminal position information created based in the network path information for the path from the terminals 501-506 to the path search target device 100 by removing, from the terminal position information, router identifiers indicating routers that do not transmit data by returning data (i.e. routers that simply forward data from the lower network level to the higher network level).

In addition to the operations described in Embodiment 1, the terminals 501-506 each acquire network path information requested by the terminal positioning device 150a, the network path information listing router identifiers that indicate the routers from the terminal to other terminals (hereinafter, "inter-terminal path information"). The terminals 501-506 also transmit the acquired inter-terminal path information to the terminal positioning device 150a.

[Structure of Terminal Positioning Device]

Figure 13:
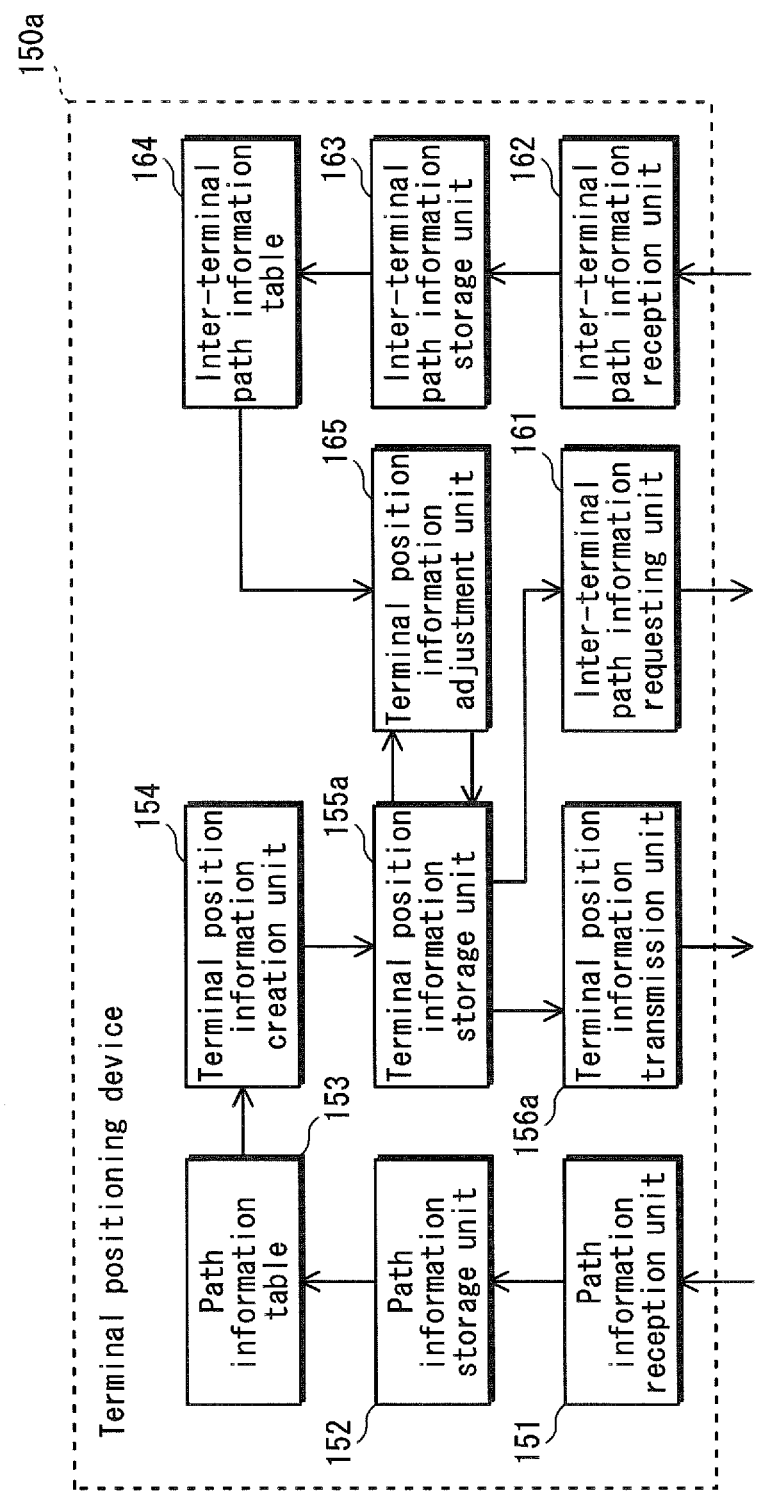
FIG. 13 is a structural diagram of a terminal positioning device in FIG. 11.

FIG. 13 is a structural diagram of the terminal positioning device 150a in FIG. 11. The terminal positioning device 150a is provided with a path information reception unit 151, a path information storage unit 152, a path information table 153, a terminal position information creation unit 154, a terminal position information storage unit 155a, a terminal position information transmission unit 156a, an inter-terminal path information requesting unit 161, an inter-terminal path information reception unit 162, an inter-terminal path information storage unit 163, an inter-terminal path information table 164, and a terminal position information adjustment unit 165.

Figure 15:
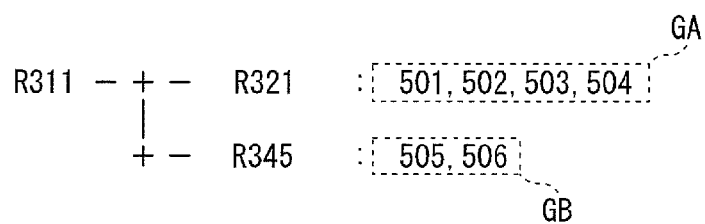
FIG. 15 shows the terminal position information in FIG. 5 after being adjusted using the inter-terminal path information table in FIG. 14.

The terminal position information storage unit 155a is a storage device such as a semiconductor memory or a HDD and stores both the terminal position information, as in the example shown in FIG. 5, created by the terminal position information creation unit 154 and also the terminal position information, as in the example shown in FIG. 15, adjusted by the terminal position information adjustment unit 165.

The inter-terminal path information requesting unit 161 specifies one or more terminals connected to the same router as a terminal group by referring to the terminal position information created by the terminal position information creation unit 154 and stored in the terminal position information storage unit 155a. Based on the specified terminal groups, the inter-terminal path information requesting unit 161 transmits, to a terminal in each terminal group, an inter-terminal path information request packet for requesting network inter-terminal path information for the path from the terminal in the terminal group to another terminal within the same terminal group. Based on the specified terminal groups, the inter-terminal path information requesting unit 161 also transmits, to a terminal in each combination of differing terminal groups, the inter-terminal path information request packet for requesting the network inter-terminal path information for the path from the terminal in one terminal group to a terminal in the other terminal group. Note that hereinafter, a terminal to which the inter-terminal path information request packet is transmitted is referred to as a "path searching terminal", and the terminal that is the target of the search by the path searching terminal to acquire the network inter-terminal path information is referred to as the "path search target terminal".

The inter-terminal path information reception unit 162 receives, from the path searching terminal to which the inter-terminal path information request packet has been transmitted, an inter-terminal path information notification packet that includes network inter-terminal path information listing router identifiers that identify the routers on the path from the path searching terminal to the path search target terminal. The inter-terminal path information reception unit 162 also transmits the network inter-terminal path information to the inter-terminal path information storage unit 163.

Note that the inter-terminal path information requesting unit 161 and the inter-terminal path information reception unit 162 are examples of the inter-terminal path information acquisition unit.

The inter-terminal path information storage unit 163 stores, in the inter-terminal path information table 164, the network inter-terminal path information received from the inter-terminal path information reception unit 162 in association with information (hereinafter, "inter-terminal identifier") indicating that the network inter-terminal path information is for the path from the path searching terminal to the path search target terminal.

Figure 14:
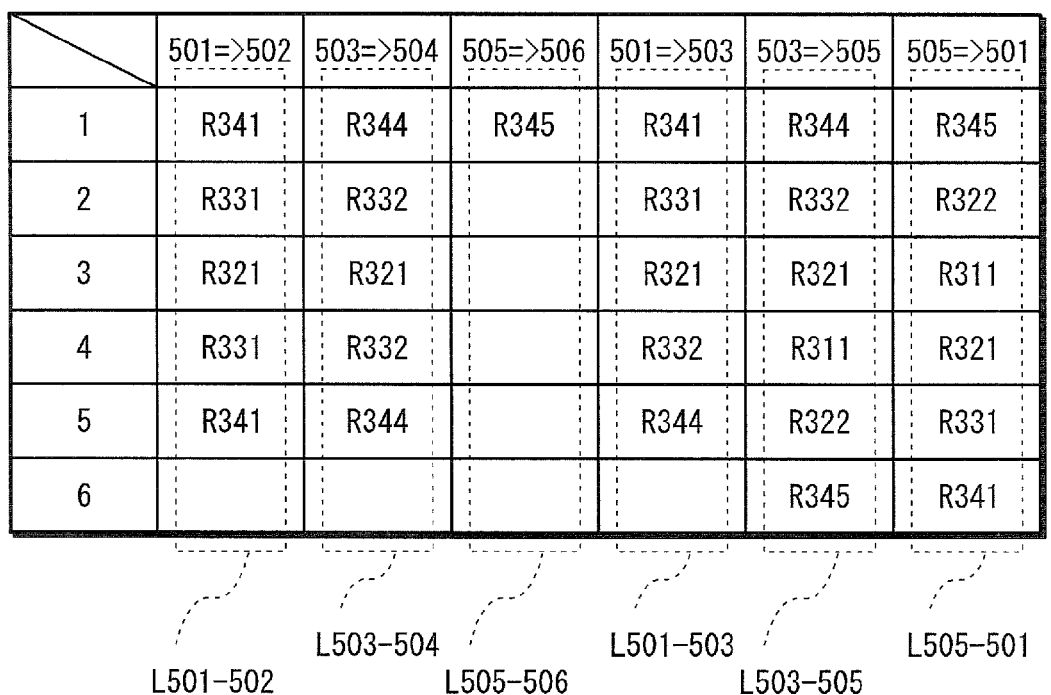
FIG. 14 shows an example of an inter-terminal path information table in FIG. 13.

The inter-terminal path information table 164 is stored on a storage device such as a semiconductor memory or a Hard Disk Drive (HDD). FIG. 14 shows an example of the inter-terminal path information table 164. The example of the inter-terminal path information table 164 in FIG. 14 stores, pieces of network inter-terminal path information from the path searching terminals to the path search target terminals for all terminal groups and for all combinations of different terminal groups, i.e. L501-502, L503-504, L505-506, L501-503, L503-505, and L505-501, in association with the respective inter-terminal identifiers, i.e. 501 to 502, 503 to 504, 505 to 506, 501 to 503, 503 to 505, and 505 to 501. Note that the network inter-terminal path information corresponding to "A to B" is the network inter-terminal path information for the path from terminal A to terminal B.

The terminal position information adjustment unit 165 refers to the inter-terminal path information table 164 to remove, from the terminal position information created by the terminal position information creation unit 154 and stored in the terminal position information storage unit 155*a*, the router identifiers indicating routers that do not transmit data by returning data (i.e. routers that simply forward data from the lower network level to the higher network level). For example, the terminal position information adjustment unit 165 removes, from among the router identifiers included in the terminal position information created by the terminal position information creation unit 154, router identifiers that are not at the uppermost router identifier in any of the pieces of network inter-terminal path information in the inter-terminal path information table. The terminal position information adjustment unit 165 thereby adjusts the terminal position information created by the terminal position information creation unit 154, storing the adjusted terminal position information in the terminal position information storage unit 155*a*.

For example, the terminal position information adjustment unit 165 refers to the inter-terminal path information table 164 shown in FIG. 14 to remove, from the terminal position information shown in FIG. 5, the router identifiers for routers that do not transmit data by returning data, thereby adjusting the terminal position information shown in FIG. 5 to the terminal position information shown in FIG. 15. Note that in FIG. 15, the terminals 501, 502, 503, and 504 belong to the same terminal group GA, and the terminals 505 and 506 belong to the same terminal group GB.

The terminal position information transmission unit 156*a* transmits, to the delivery management device 200, the terminal position notification packet that includes the terminal position information adjusted by the terminal position information adjustment unit 165 and stored in the terminal position information storage unit 155*a*.

<Operations of Network Positioning System>
[Operations to Acquire Network Inter-Terminal Path Information]

Figure 16:
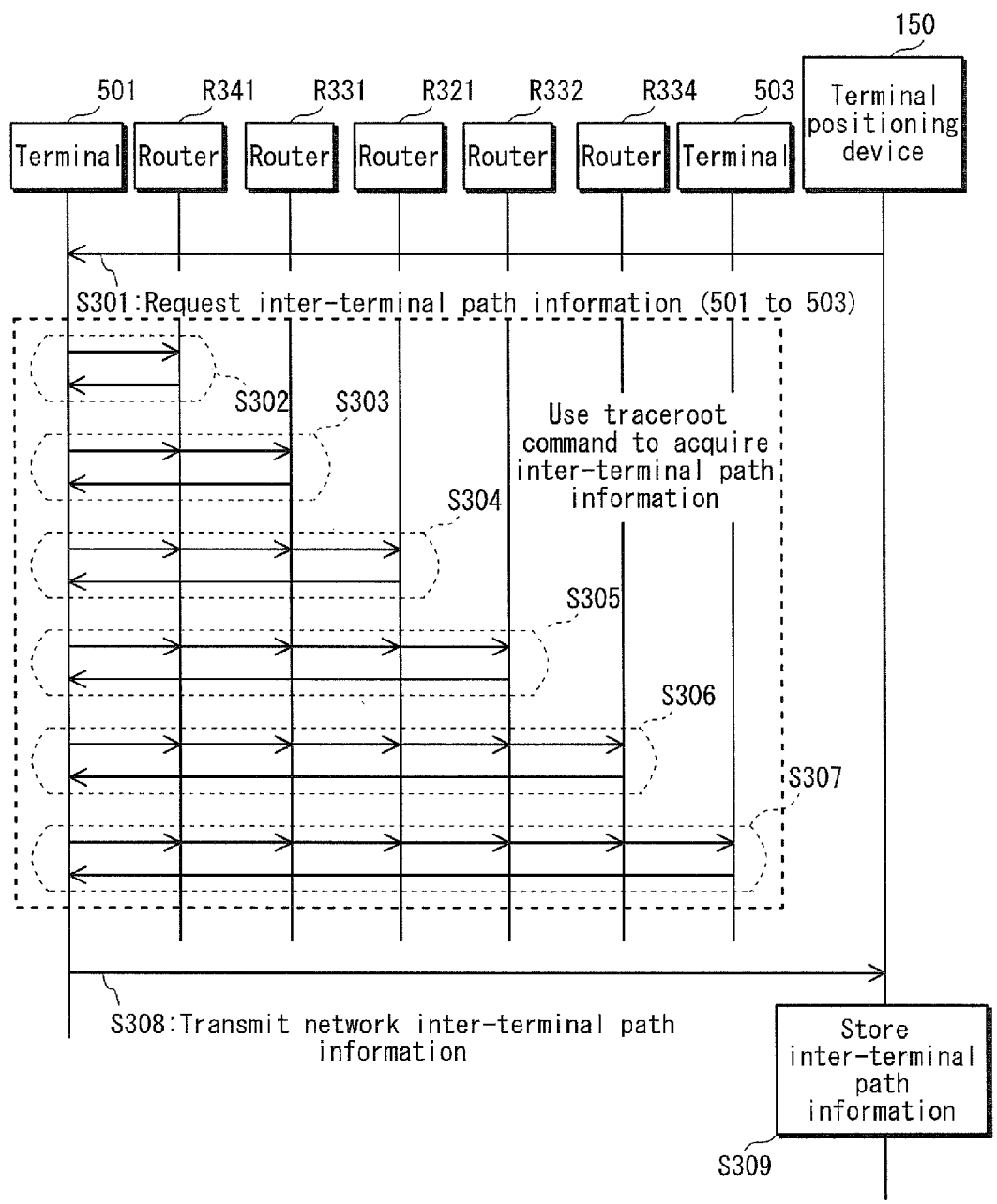
FIG. 16 is an example of an operational sequence relating to operations within the network positioning system of FIG. 11 for acquisition of network inter-terminal path information.

FIG. 16 is an example of an operational sequence relating to operations within the network positioning system 1*a* of FIG. 11 for acquisition of network inter-terminal path information. In the example of the operational sequence in FIG. 16, the terminal positioning device 150*a* issues a request to terminal 501 for the network inter-terminal path information for the path from the terminal 501 to the terminal 503 and thereby acquires the network inter-terminal path information for the path from the terminal 501 to the terminal 503. Note that the explanation of the operational sequence in FIG. 16 can be applied to operations for acquiring the network path information for any two terminals, taking into account that the routers between the two terminals differ.

The inter-terminal path information requesting unit 161 in the terminal positioning device 150*a* transmits, to the terminal 501, the inter-terminal path information request packet for requesting the network inter-terminal path information for the path from the terminal 501 to the terminal 503 (step S301).

The terminal 501 receives the inter-terminal path information request packet from the terminal positioning device 150*a* and executes a traceroute command to begin acquisition of network inter-terminal path information for the path from the terminal 501 to the terminal 503. First, the terminal 501 transmits a packet whose TTL equals one to the terminal 503. The router R341 receives the packet whose TTL equals one and decrements the value of the TTL by one. Since the TTL now equals zero, the router R341 discards the packet and returns an error response packet that includes the router identifier for the router R341 to the terminal 501. The terminal 501 receives the error response packet and acquires the router identifier for the router R341 (step S302).

Next, the terminal 501 transmits a packet whose TTL equals two to the terminal 503. The router R341 receives the packet and decrements the value of the TTL by one. Since the TTL does not equal zero, the router R341, which is not provided with the return function, forwards the packet whose TTL now equals one to the router R331, which is at the next higher level. The router R331 receives the packet whose TTL equals one and decrements the value of the TTL by one. Since the TTL now equals zero, the router R331 discards the packet and returns an error response packet that includes the router identifier for the router R331 to the terminal 501. The terminal 501 receives the error response packet and acquires the router identifier for the router R331 (step S303).

Next, the terminal 501 transmits a packet whose TTL equals three to the terminal 503. The routers R341 and R331 forward the received packet while decrementing the value of the TTL by one. Since these routers are not provided with the return function, they forward the packet to the router at the next higher level. The router R321 receives the packet whose TTL equals one and decrements the value of the TTL by one. Since the TTL now equals zero, the router R321 discards the packet and returns an error response packet that includes the router identifier for the router R321 to the terminal 501. The terminal 501 receives the error response packet and acquires the router identifier for the router R321 (step S304).

Next, the terminal 501 transmits a packet whose TTL equals four to the terminal 503. The routers R341 and R331 forward the received packet while decrementing the value of the TTL by one. Since these routers are not provided with the return function, they forward the packet to the router at the next higher level. The router R321 receives the packet whose TTL equals two and decrements the value of the TTL by one. Since the TTL does not equal zero, the router R321, which is provided with the return function, forwards the packet whose TTL now equals one to the router R332, which is at the next lower level. The router R332 receives the packet whose TTL equals one and decrements the value of the TTL by one. Since the TTL now equals zero, the router R332 discards the packet and returns an error response packet that includes the router identifier for the router R332 to the terminal 501. The terminal 501 receives the error response packet and acquires the router identifier for the router R332 (step S305).

Next, the terminal 501 transmits a packet whose TTL equals five to the terminal 503. The routers R341, R331, R321, and R332 forward the received packet while decrementing the value of the TTL by one. The router R344 receives the packet whose TTL equals one and decrements the value of the TTL by one. Since the TTL now equals zero, the router R344 discards the packet and returns an error response packet that includes the router identifier for the router R344 to the terminal 501. The terminal 501 receives the error response packet and acquires the router identifier for the router R344 (step S306).

Next, the terminal 501 transmits a packet whose TTL equals six to the terminal 503. The routers R341, R331, R321, R332, and R344 forward the received packet while decrementing the value of the TTL by one. The terminal 503 receives the packet whose TTL equals one and decrements the value of the TTL by one. Since the TTL now equals zero, the terminal 503 discards the packet and returns an arrival response packet to the terminal 501. The terminal 501 receives this arrival response packet (step S307). The terminal 501 thus completes acquisition, via the traceroute command, of the network inter-terminal path information.

The terminal 501 creates the network inter-terminal path information by arranging, in order, the router identifiers for the routers from terminal 501 to terminal 503 as acquired by using the traceroute command. The terminal 501 then transmits the inter-terminal path information notification packet, which includes the created network inter-terminal path information, to the terminal positioning device 150a (step S308).

In the terminal positioning device 150a, the inter-terminal path information reception unit 162 receives, from the terminal 501, the inter-terminal path information notification packet that includes the network inter-terminal path information from the terminal 501 to the terminal 503, and the inter-terminal path information storage unit 163 stores the network inter-terminal path information from the terminal 501 to the terminal 503 in the inter-terminal path information table 164 (step S309).

[Operations to Create and Adjust Terminal Position Information]

Figure 17:
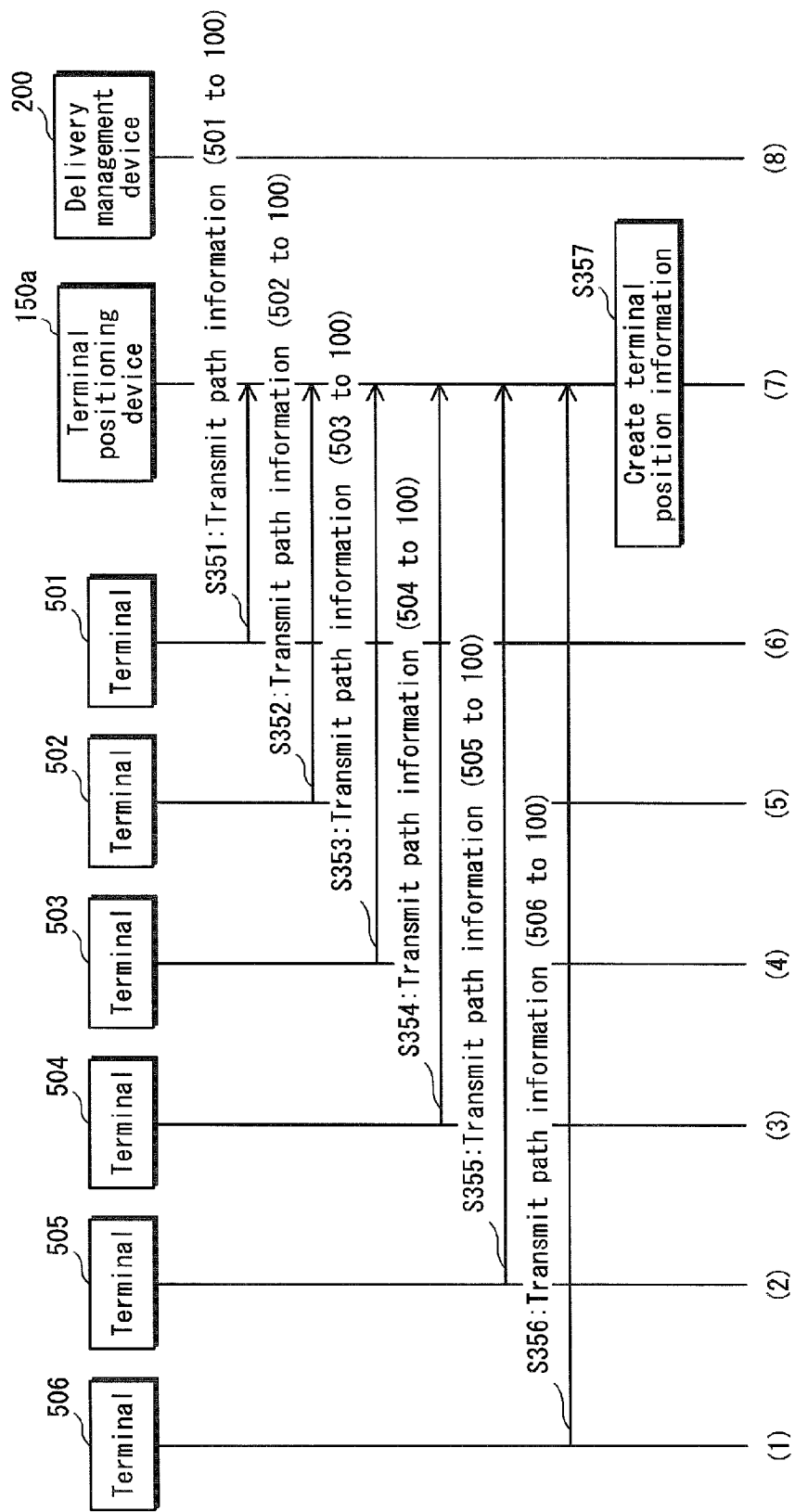
FIG. 17 is an example of an operational sequence relating to operations within the network positioning system of FIG. 11 for creation and adjustment of terminal position information.
Figure 18:
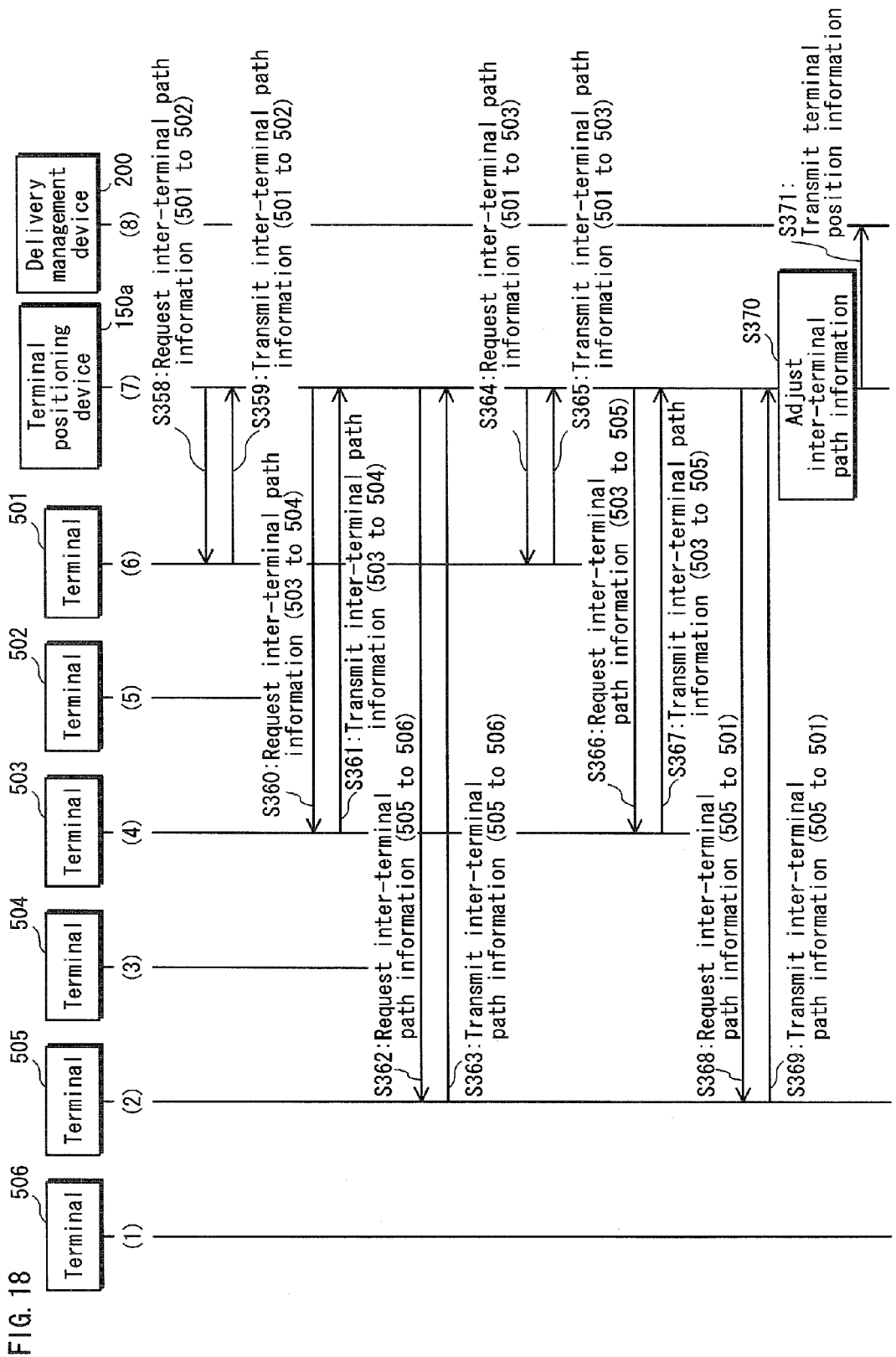
FIG. 18 is an example of an operational sequence relating to operations within the network positioning system of FIG. 11 for creation and adjustment of terminal position information.

FIGS. 17 and 18 are an example of an operational sequence relating to operations within the network positioning system 1a of FIG. 11 for creation and adjustment of terminal position information.

The terminals 501-506 each execute a traceroute command to create the network path information for the path from the terminal to the path search target device 100. Each of the terminals 501-506 then transmits, to the terminal positioning device 150a, the path information notification packet that includes the terminal identifier indicating the terminal and the network path information. In the terminal positioning device 150a, the path information reception unit 151 receives the path information notification packets from the terminals 501-506, and the path information storage unit 152 stores, in the path information table 153, the pieces of network path information created by the terminals 501-506 in association with the terminal identifiers indicating the respective terminals (steps S351-S356). Note that the "path information (A to 100)" in steps S351-S356 represents the network path information for the path from terminal A to the path search target device 100.

In the terminal positioning device 150a, the terminal position information creation unit 154 creates terminal position information indicating the position of the terminals 501-506 in the network shown in FIG. 5 from the path information table 153 shown in FIG. 4, storing the created terminal position information in the terminal position information storage unit 155a (step S357).

In the terminal positioning device 150a, the inter-terminal path information requesting unit 161 specifies one or more terminals connected to the same router as a terminal group by referring to the terminal position information shown in FIG. 5. Based on the specified terminal groups, the inter-terminal path information requesting unit 161 transmits, to the terminal 501 in the terminal group G1, the inter-terminal path information request packet for requesting the network inter-terminal path information for the path from the terminal 501 to the terminal 502, which is in the same terminal group G1 (step S358). The terminal 501 receives the inter-terminal path information request packet and executes a traceroute command to create network inter-terminal path information for the path from the terminal 501 to the terminal 502. The terminal 501 then transmits the inter-terminal path information notification packet, which includes the created network inter-terminal path information, to the terminal positioning device 150a. In the terminal positioning device 150a, the inter-terminal path information reception unit 162 receives the inter-terminal path information notification packet from the terminal 501, and the inter-terminal path information storage unit 163 stores the network inter-terminal path information in the inter-terminal path information table 164 (step S359).

Based on the terminal groups specified by referring to the terminal position information shown in FIG. 5, the inter-terminal path information requesting unit 161 in the terminal positioning device 150a transmits, to the terminal 503 in the terminal group G2, the inter-terminal path information request packet for requesting the network inter-terminal path information for the path from the terminal 503 to the terminal 504, which is in the same terminal group G2 (step S360). The terminal 503 receives the inter-terminal path information request packet and executes a traceroute command to create network inter-terminal path information for the path from the terminal 503 to the terminal 504. The terminal 503 then transmits the inter-terminal path information notification packet, which includes the created network inter-terminal path information, to the terminal positioning device 150a. In the terminal positioning device 150a, the inter-terminal path information reception unit 162 receives the inter-terminal path information notification packet from the terminal 503, and the inter-terminal path information storage unit 163 stores the network inter-terminal path information in the inter-terminal path information table 164 (step S361).

Based on the terminal groups specified by referring to the terminal position information shown in FIG. 5, the inter-terminal path information requesting unit 161 in the terminal positioning device 150a transmits, to the terminal 505 in the terminal group G3, the inter-terminal path information request packet for requesting the network inter-terminal path information for the path from the terminal 505 to the terminal 506, which is in the same terminal group G3 (step S362). The terminal 505 receives the inter-terminal path information request packet and executes a traceroute command to create network inter-terminal path information for the path from the terminal 505 to the terminal 506. The terminal 505 then transmits the inter-terminal path information notification packet, which includes the created network inter-terminal path information, to the terminal positioning device 150a. In the terminal positioning device 150a, the inter-terminal path information reception unit 162 receives the inter-terminal path information notification packet from the terminal 505, and the inter-terminal path information storage unit 163 stores the network inter-terminal path information in the inter-terminal path information table 164 (step S363).

Based on the terminal groups specified by referring to the terminal position information shown in FIG. 5, the inter-terminal path information requesting unit 161 in the terminal positioning device 150a transmits, to the terminal 501 in the terminal group G1, the inter-terminal path information request packet for requesting the network inter-terminal path information for the path from the terminal 501 to the terminal 503 in the terminal group G2, a different terminal group than the terminal 501 (step S364). The terminal 501 receives the inter-terminal path information request packet and executes a traceroute command to create network inter-terminal path information for the path from the terminal 501 to the terminal 503. The terminal 501 then transmits the inter-terminal path information notification packet, which includes the created network inter-terminal path information, to the terminal positioning device 150a. In the terminal positioning device 150a, the inter-terminal path information reception unit 162 receives the inter-terminal path information notification packet from the terminal 501, and the inter-terminal path information storage unit 163 stores the network inter-terminal path information in the inter-terminal path information table 164 (step S365).

Based on the terminal groups specified by referring to the terminal position information shown in FIG. 5, the inter-terminal path information requesting unit 161 in the terminal positioning device 150a transmits, to the terminal 503 in the terminal group G2, the inter-terminal path information request packet for requesting the network inter-terminal path information for the path from the terminal 503 to the terminal 505 in the terminal group G3, a different terminal group than the terminal 503 (step S366). The terminal 503 receives the inter-terminal path information request packet and executes a traceroute command to create network inter-terminal path information for the path from the terminal 503 to the terminal 505. The terminal 503 then transmits the inter-terminal path information notification packet, which includes the created network inter-terminal path information, to the terminal positioning device 150a. In the terminal positioning device 150a, the inter-terminal path information reception unit 162 receives the inter-terminal path information notification packet from the terminal 503, and the inter-terminal path information storage unit 163 stores the network inter-terminal path information in the inter-terminal path information table 164 (step S367).

Based on the terminal groups specified by referring to the terminal position information shown in FIG. 5, the inter-terminal path information requesting unit 161 in the terminal positioning device 150a transmits, to the terminal 505 in the terminal group G3, the inter-terminal path information request packet for requesting the network inter-terminal path information for the path from the terminal 505 to the terminal 501 in the terminal group G1, a different terminal group than the terminal 505 (step S368). The terminal 505 receives the inter-terminal path information request packet and executes a traceroute command to create network inter-terminal path information for the path from the terminal 505 to the terminal 501. The terminal 505 then transmits the inter-terminal path information notification packet, which includes the created network inter-terminal path information, to the terminal positioning device 150a. In the terminal positioning device 150a, the inter-terminal path information reception unit 162 receives the inter-terminal path information notification packet from the terminal 505, and the inter-terminal path information storage unit 163 stores the network inter-terminal path information in the inter-terminal path information table 164 (step S369).

In the terminal positioning device 150a, the terminal position information adjustment unit 165 adjusts the terminal position information created in step S357 and stored in the terminal position information storage unit 155a by referring to the inter-terminal path information table 164, storing the adjusted terminal position information in the terminal position information storage unit 155a (step S370).

In the terminal positioning device 150a, the terminal position information transmission unit 156a transmits the terminal position notification packet that includes the terminal position information adjusted in step S370 and stored in the terminal position information storage unit 155a to the delivery management device 200. In the delivery management device 200, the terminal position information reception unit 201 receives the terminal position notification packet, which includes the terminal position information, from the terminal positioning device 150, and the terminal position information storage unit 202 stores the terminal position information in the terminal position information storage unit 203 (step S371).

Via the above steps, the terminals 501-506 recognize that they are positioned within the same lower-level sub-network. In order to reduce traffic for P2P data transfer, it is predicted that return of data at even lower levels will become possible. Therefore, a demand exists for the advantageous effect of simplification, by the terminal position information adjustment unit 165, of the terminal position information created by the terminal position information creation unit 154.

Embodiment 3

The following describes Embodiment 3 of the present invention with reference to the drawings. In addition to the structure in Embodiment 1, Embodiment 3 adds a data providing device that provides data to terminals within a terminal group. Constituent elements in Embodiment 3 that are substantially the same as in Embodiment 1 bear the same reference signs, and since the description thereof applies in Embodiment 3 as well, such description is either omitted or kept brief.

<Structure of Network Positioning System>

Figure 19:
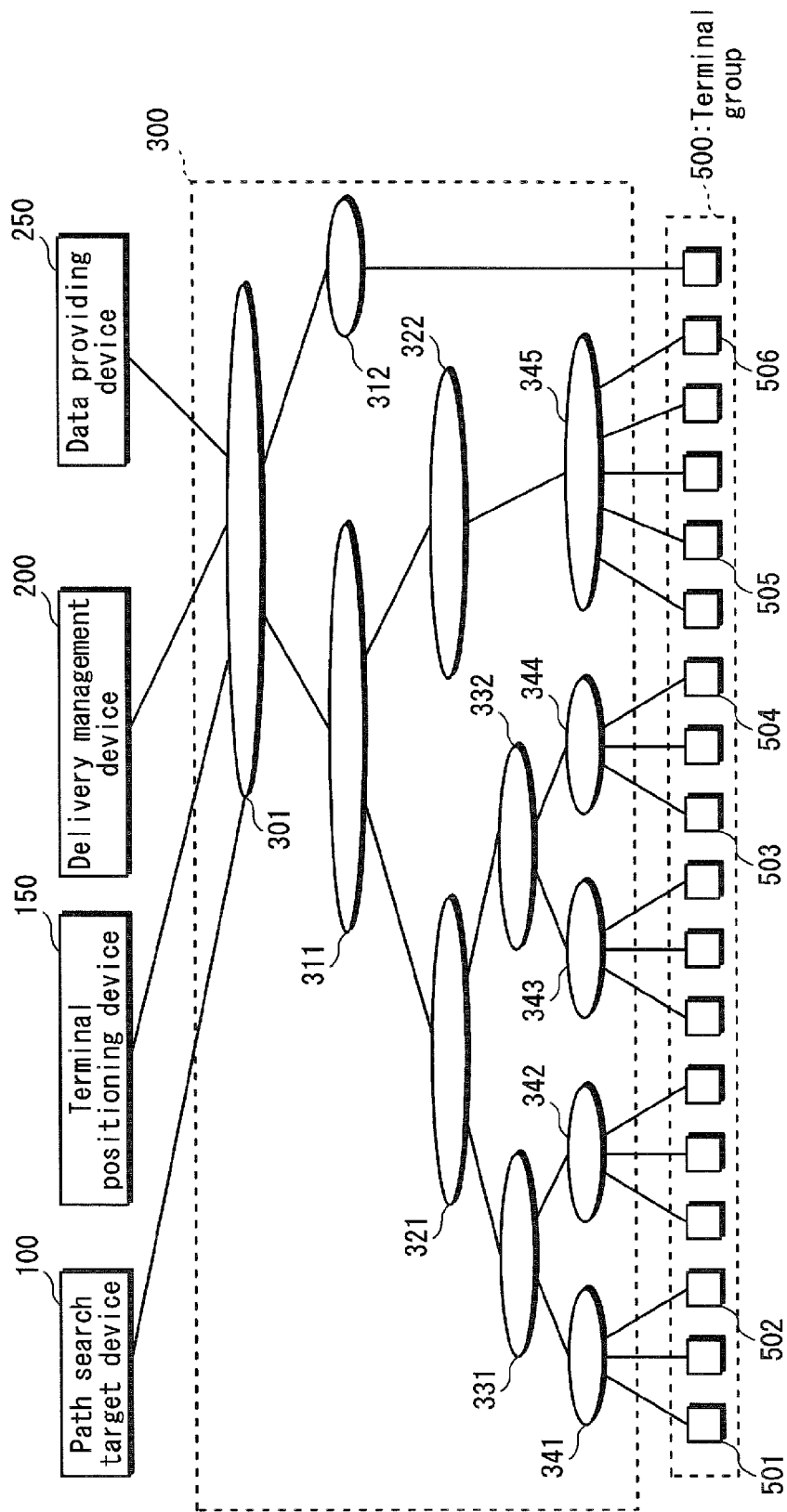
FIG. 19 is a structural diagram of a network positioning system according to Embodiment 3.

FIG. 19 is a structural diagram of a network positioning system 1b according to Embodiment 3. The network positioning system 1b in FIG. 19 includes a data providing device 250 in addition to the elements of the network positioning system 1. The data providing device 250 provides data to terminals in the network.

The terminal positioning device 150 acquires, from each of the terminals 501-506, the network path information for the path from the terminal to the path search target device 100. The terminal positioning device 150 also acquires, from the data providing device 250, the network path information for the path from the data providing device 250 to the path search target device 100. The terminal positioning device 150 stores the pieces of network path information L501-L506 and L250 respectively acquired from the terminals 501-506 and the data providing device 250 in the path information table 153. FIG. 20 shows the path information table 153 at this point.

Figure 21:
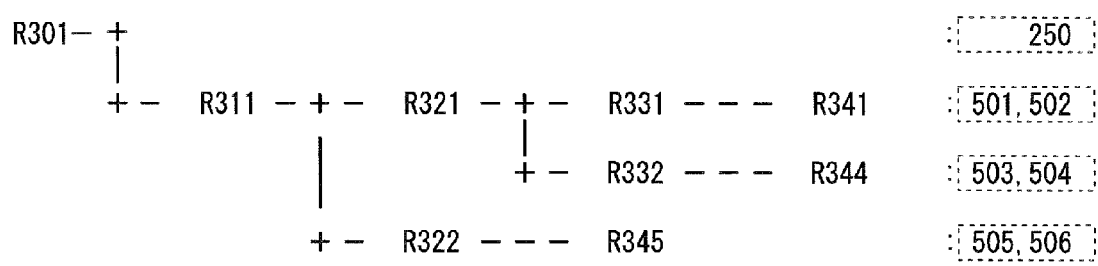
FIG. 21 shows terminal position information created from the path information table in FIG. 19.

The terminal positioning device 150 creates terminal position information indicating the position of the terminals 501-506 and the data providing device 250 in the network shown in FIG. 21 from the path information table 153 shown in FIG. 20, transmitting the created terminal position information to the delivery management device 200.

When data that is not stored by any of the terminals 501-506 in the terminal group 500 is first transmitted to any of the terminals 501-506, the delivery management device 200 selects, based on the terminal position information received from the terminal positioning device 150, the terminal that is located closest in the network to the data providing device 250 to be the terminal to which the data is transmitted. Data is thus provided from the data providing device 250 to a terminal that is positioned close in the network to the data providing device 250.

Embodiment 4

The following describes Embodiment 4 of the present invention with reference to the drawings. In addition to the structure in Embodiment 3, Embodiment 4 adds terminals (hereinafter, "dedicated transmission terminals") that are only used for transmission of data. Constituent elements in Embodiment 4 that are substantially the same as in Embodiments 1 and 3 bear the same reference signs, and since the description thereof applies in Embodiment 4 as well, such description is either omitted or kept brief.

<Structure of Network Positioning System>

Figure 22:
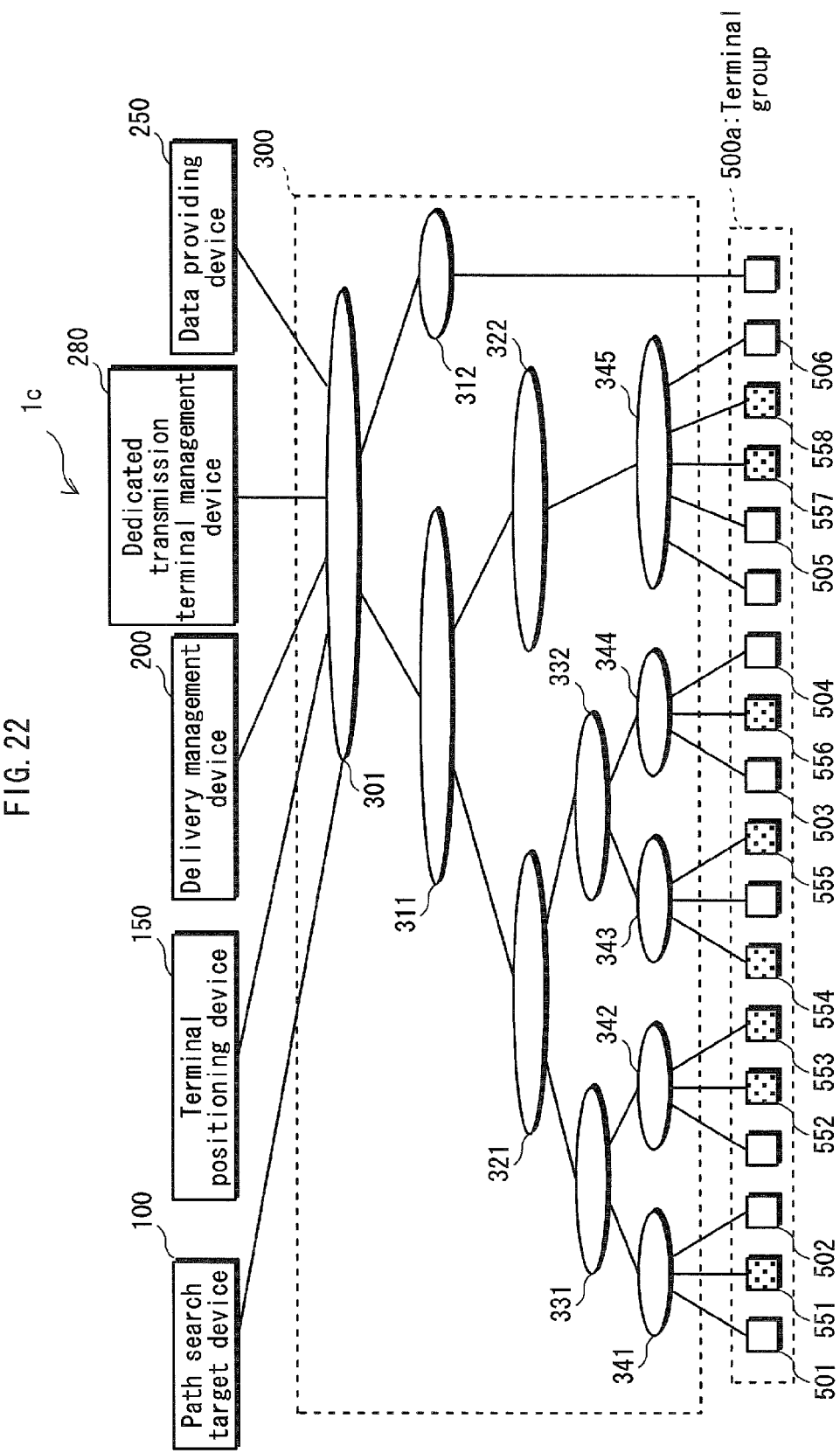
FIG. 22 is a structural diagram of a network positioning system according to Embodiment 4.

FIG. 22 is a structural diagram of a network positioning system 1c according to Embodiment 4. The network positioning system 1c in FIG. 22 includes a path search target device 100, a terminal positioning device 150, a delivery management device 200, a data providing device 250, a dedicated transmission terminal management device 280, a network 300, and a terminal group 500a.

The terminal group 500a includes terminals 501-506 that receive and deliver data as well as terminals (dedicated transmission terminals) 551-558 that only transmit data. Note that the number of terminals that are recipients or deliverers of data is not limited in any particular way. Furthermore, the number of dedicated transmission terminals is not limited in any particular way.

Data that is provided to other terminals (for example the terminals 501-506) is transferred in advance from the data providing device 250 to the dedicated transmission terminals 551-558. The dedicated transmission terminals 551-558 store the data received from the data providing device 250. The dedicated transmission terminals 551-558 receive, from another terminal (for example, from the terminals 501-506), a data transmission request packet that includes a data identifier indicating requested delivery data. The operational status of a processing unit (hereinafter, "controlled processing unit") in each of the dedicated transmission terminals 551-558 for transmitting requested delivery data to other terminals is controlled by a dedicated transmission terminal management device 280.

The data provided in advance to each of the dedicated transmission terminals 551-558 may be the entire data held by the data providing device 250. Alternatively, the data provided to each of the dedicated transmission terminals 551-558 in advance may be part of the data held by the data providing device 250, or the dedicated transmission terminals 551-558 may in combination hold all of the data held by the data providing device 250. The data held by the dedicated transmission terminals 551-558 in combination need not be all of the data held by the data providing device 250.

Each of the dedicated transmission terminals 551-558 may be a dedicated device or may be a consumer product, such as an HDD recorder, a part of which is provided with the capability of a dedicated transmission terminal.

Figure 23:
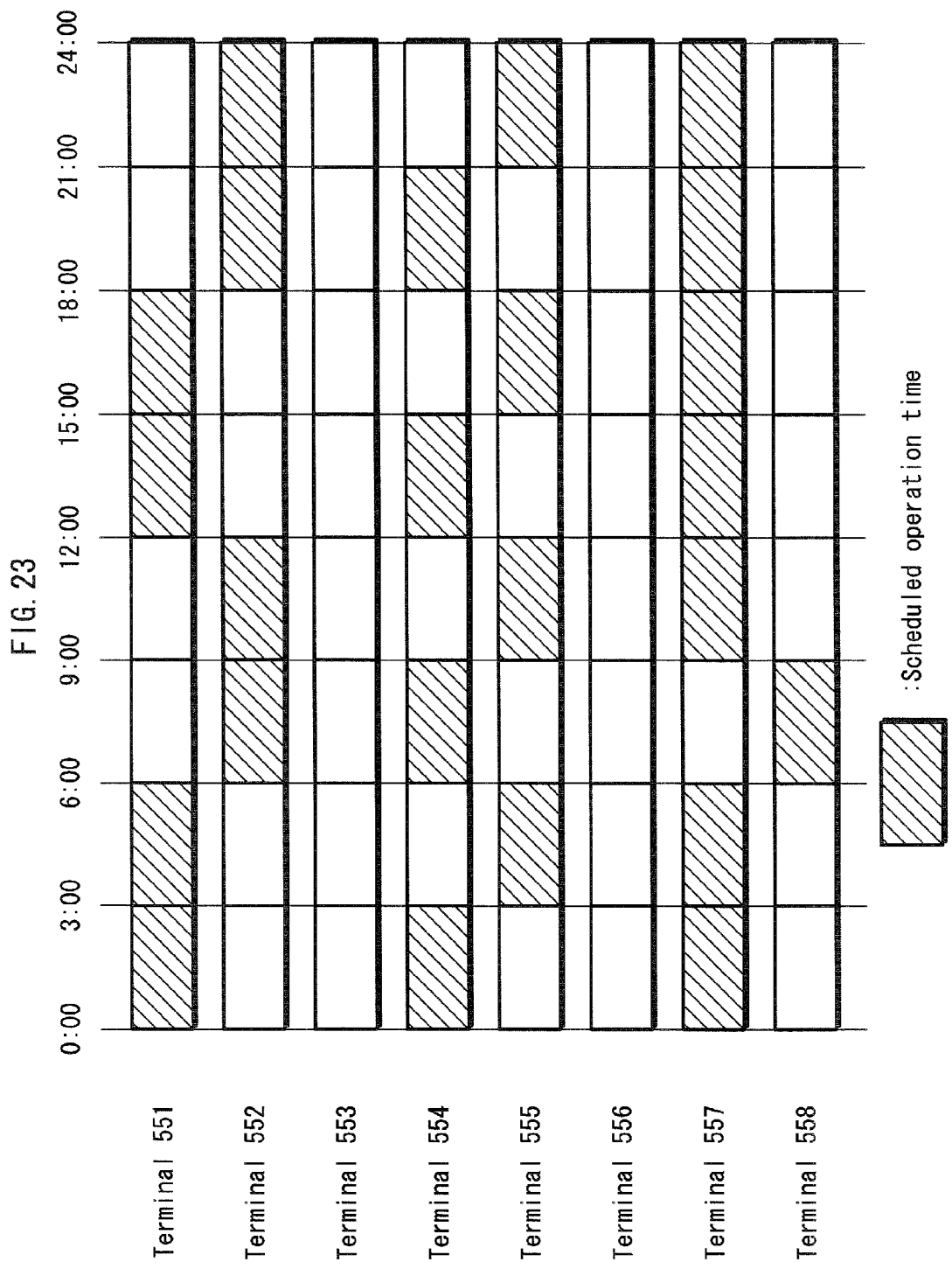
FIG. 23 shows an example of an operational status management table stored in a dedicated transmission terminal management device of FIG. 22.

Each of the dedicated transmission terminals 551-558 transmits, to the terminal positioning device 150, the terminal identifier indicating the terminal and the path information notification packet that includes the network path information for the path from the terminal to the path search target device 100. The dedicated transmission terminals 551-558 each transmit, to the delivery management device 200, the data list notification packet that includes the terminal identifier indicating the terminal and the data list that lists the data identifiers indicating the data stored by the terminal. The dedicated transmission terminals 551-558 also receive, from another terminal, the data transmission request packet that includes the data identifier indicating the requested delivery data. The dedicated transmission terminals 551-558 then transmit the requested delivery data to the other terminal The dedicated transmission terminal management device 280 holds an operational status management table, an example of which is shown in FIG. 23, for managing the operational status of the controlled processing unit of each of the dedicated transmission terminals 551-558. The operational status management table is stored in a storage device, such as a semiconductor memory or HDD, of the dedicated transmission terminal management device 280. The example of the operational status management table shown in FIG. 23 stores scheduled operation times for each of the dedicated transmission terminals 551-558.

The dedicated transmission terminal management device 280 refers to the operational status management table to perform time management, causing the controlled processing unit of the dedicated transmission terminals 551-558 to operate at the beginning of a scheduled operation time period and causing the controlled processing unit of the dedicated transmission terminals 551-558 to stop at the end of the period.

The terminal positioning device 150 receives network path information from the terminals 501-506, the data providing device 250, and the dedicated transmission terminals 551-558. The terminal positioning device 150 uses the network path information received from the terminals 501-506, the data providing device 250, and the dedicated transmission terminals 551-558 to create terminal position information indicating the position in the network of the terminals 501-506, the data providing device 250, and the dedicated transmission terminals 551-558, transmitting the created terminal position information to the delivery management device 200.

The delivery management device 200 receives notification from the dedicated transmission terminal management device 280 of the operational status of each of the dedicated transmission terminals 551-558 and uses the terminal position information received from the terminal positioning device 150 to select the data transmission terminal from among the terminals 501-506, the data providing device 250, and the operation terminals among the dedicated transmission terminals 551-558.

The structure of Embodiment 4 may greatly reduce the amount of traffic in the network when the terminals 501-508 receive data by providing data in advance from the data providing device 250 to the dedicated transmission terminals 551-558.

<<Supplementary Explanation>>

The present invention is not limited to the description of the above Embodiments, but rather may be implemented by a variety of modifications in order to achieve the object of the present invention or a related or associated object thereof. For example, the following modifications are possible.

(1) In the above Embodiments, the path search target device 100 is connected to the router R301 in the uppermost sub-network 301 in the hierarchical network, but the path search target device 100 is not limited in this way and may be connected to a router in any sub-network.

(2) In the above Embodiments, the terminal located closest in the network to the data reception terminal is selected as the data transmission terminal, but the present invention is not limited in this way. A terminal (for example, the terminal currently having the smallest processing load) among a plurality of terminals located close in the network to the data reception terminal may be selected as the data transmission terminal.

Furthermore, when data is transmitted and received between terminals, the delivery management device may use the terminal position information created or adjusted as in the above Embodiments to select the terminal that transmits data or the terminal that receives data.

For example, based on the terminal position information, the delivery management device may select, as the transmission terminal, a terminal located close in the network to the terminal attempting to receive data. The delivery management device may also select, as the reception terminal, a terminal located close in the network to the terminal attempting to transmit data. The delivery management device thereby effectively reduces traffic in the network when data is transmitted and received between terminals.

Alternatively, based on the terminal position information, the delivery management device may select, as the transmission terminal, a terminal located far in the network from the terminal attempting to receive data. The delivery management device may also select, as the reception terminal, a terminal located far in the network from the terminal attempting to transmit data. This enables terminals that are located far from each other in the network to hold the same data, thus reducing the probability of loss of data during a fire, a natural disaster, etc.

(3) In the above Embodiments, the network path information for the path from the terminals 501-506 or the like to the path search target device 100, as well as the network inter-terminal path information for the path from one terminal (path searching terminal) to another terminal (path search target terminal) is acquired via a traceroute command, but the present invention is not limited in this way. The network path information may be acquired using any method that acquires network path information. For example, the tracert command in Windows™ may be used to acquire the network path information for the path from the terminals 501-506 or the like to the path search target device 100 or to acquire the network inter-terminal path information for the path from the path searching terminal to the path search target terminal.

(4) In Embodiment 3, when data that is not stored by any of the terminals 501-506 is first transmitted from the data providing device 250, the number of recipient terminals is one, but the number is not limited in this way. Data may be transmitted to two or more terminals.

(5) The data providing device 250 described in Embodiment 3 may be used as the transmitting device that transmits data to the terminals 501-506 when the terminals 501-506 attempt to receive data.

(6) In Embodiment 3, when data that is not stored by any of the terminals 501-506 is first transmitted from the data providing device 250, a terminal located closest in the network to the data providing device 250 is selected as the recipient terminal, but selection of the recipient terminal is not limited in this way. For example, the terminal located farthest in the network from the data providing device 250 may be selected as the recipient terminal.

(7) In Embodiment 4, the dedicated transmission terminal management device 280 refers to the operational status management table (see FIG. 23) to perform time management of the operational status of the dedicated transmission terminals 551-558, such as by causing the dedicated transmission terminals 551-558 to operate, but the present invention is not limited in this way. For example, the dedicated transmission terminal management device 280 may manage the operational status of the dedicated transmission terminals 551-558 so that some or all of the dedicated transmission terminals 551-558 are continually in operation.

(8) In Embodiment 4, the number of the dedicated transmission terminals 551-558 is fixed, but the present invention is not limited in this way. For example, the dedicated transmission terminal management device 280 may manage the operational status of the dedicated transmission terminals 551-558 in response to the data transfer load, i.e. the number of terminals that are attempting to receive data. In this case, the dedicated transmission terminal management device 280 may, for example, cause a large number of dedicated transmission terminals to operate when the data transfer load is large and cause a small number of dedicated transmission terminals to operate when the data transfer load is small.

Figure 24:
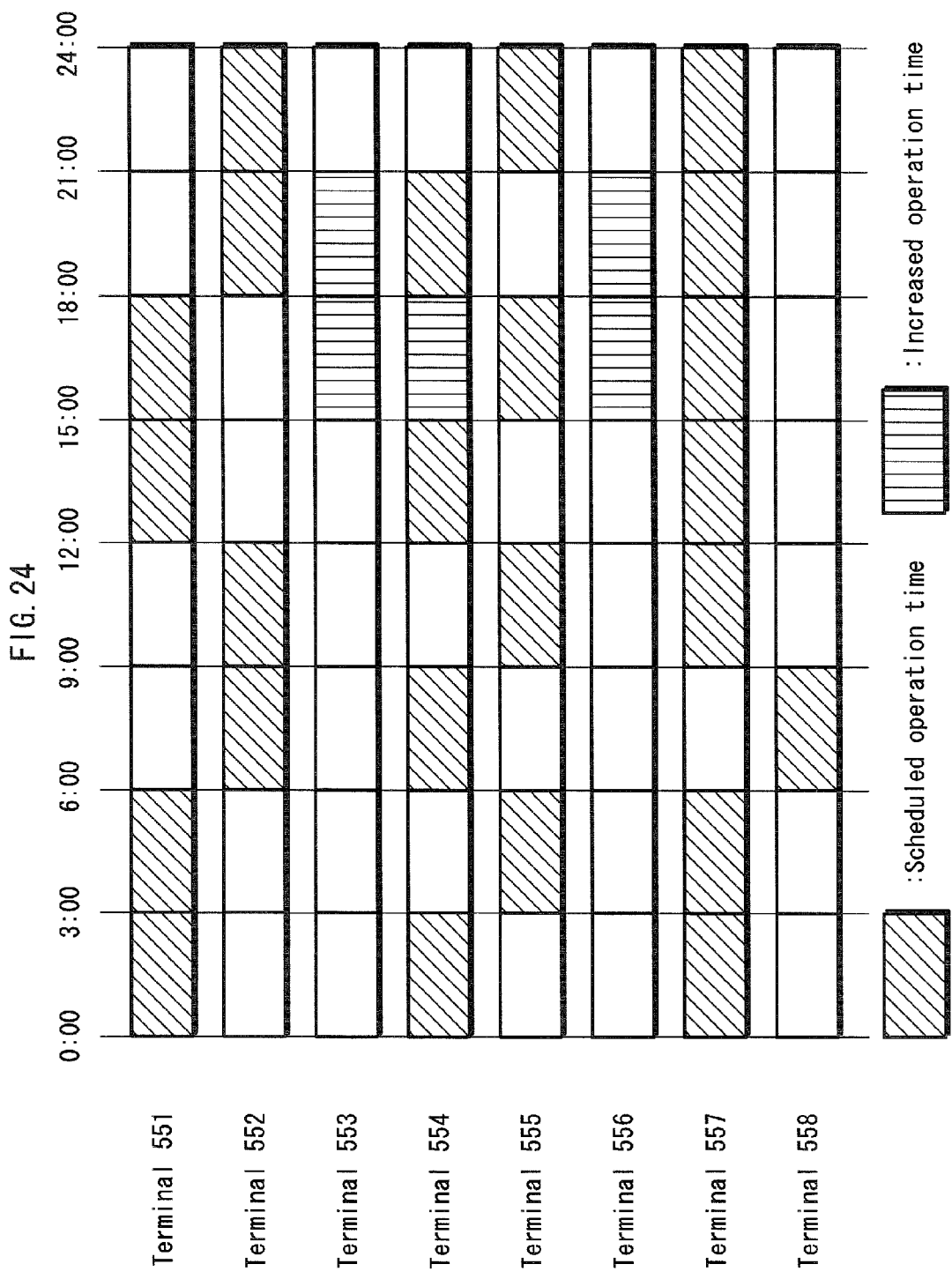
FIG. 24 shows another example of an operational status management table stored in the dedicated transmission terminal management device of FIG. 22.

(9) In Embodiment 4, the scheduled operation times for each of the dedicated transmission terminals 551-558 are fixed, but the present invention is not limited in this way. For example, the dedicated transmission terminal management device 280 may increase or decrease the scheduled operation times of the dedicated transmission terminals 551-558. FIG. 24 shows an example of an operational status management table in which the scheduled operation times of the dedicated transmission terminals 553, 554, and 556 have been increased.

Figure 25:
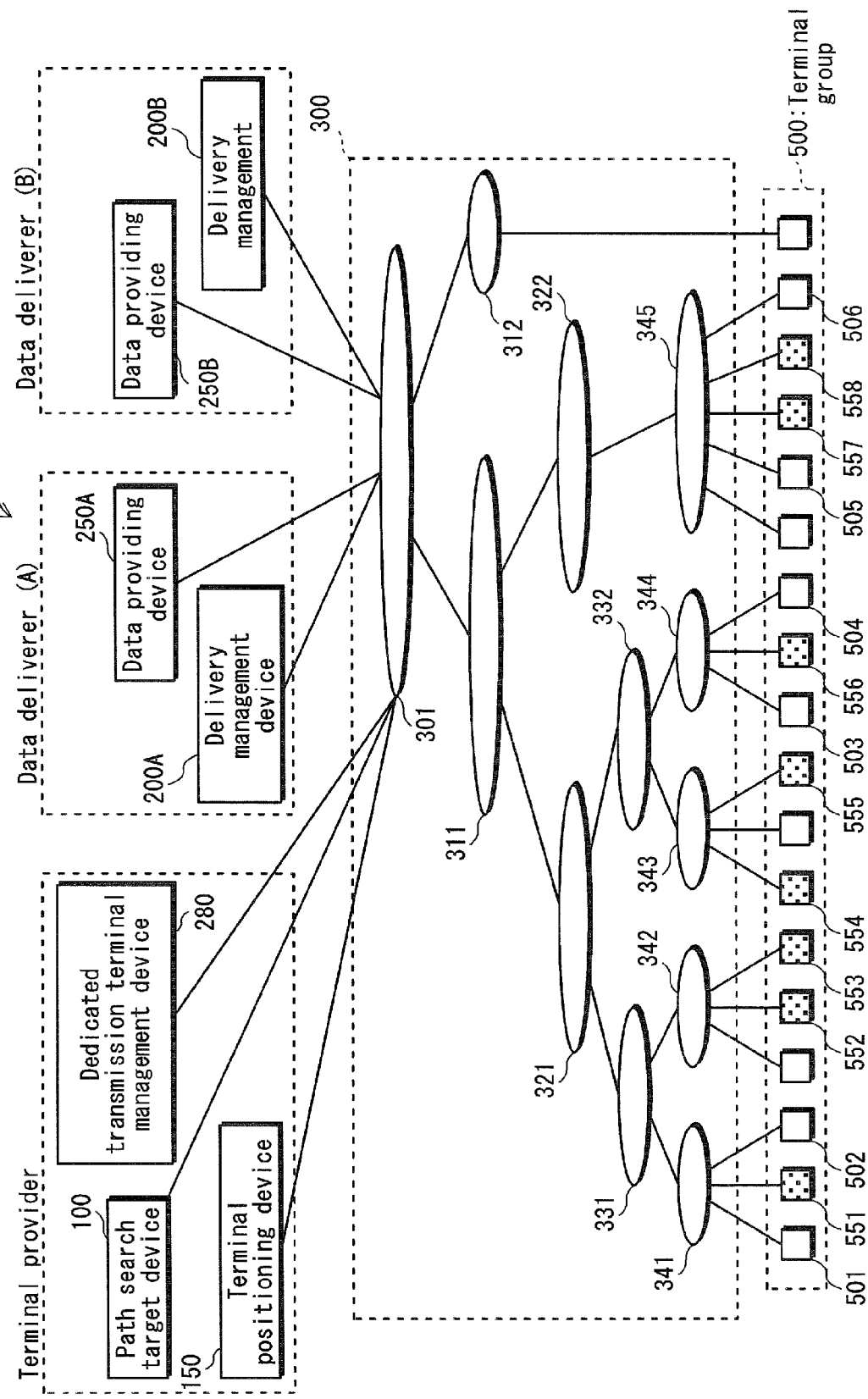
FIG. 25 is a structural diagram of a network positioning system according to a Modification of Embodiment 4.

(10) Embodiment 4 may be modified as in the network positioning system 1*d* shown in FIG. 25. In this Modification, a terminal provider establishes the path search target device 100, the terminal positioning device 150, and the dedicated transmission terminal management device 280 in the network. A data deliverer (A) establishes a delivery management device 200A and a data providing device 250A, respectively having substantially the same functions as the delivery management device 200 and the data providing device 250, in the network. A data deliverer (B) establishes a delivery management device 200B and a data providing device 250B, respectively having substantially the same functions as the delivery management device 200 and the data providing device 250, in the network.

The data deliverer (A) and the data deliverer (B) often use different data transfer rules, authentication methods, etc., and data delivery methods also change. It is therefore necessary to change the functions of dedicated transmission terminals in accordance with the data deliverer.

The dedicated transmission terminal management device 280 assigns a portion of the dedicated transmission terminals 551-558 to the data deliverer (A) and the remaining dedicated transmission terminals to the data deliverer (B). The data deliverer (A) and the data deliverer (B) configure necessary settings, etc. for delivering data to the dedicated transmission terminals respectively assigned thereto. The dedicated transmission terminals 551-558 are thereby changed to operate in accordance with the data delivery method, etc. of the data deliverer to which the terminals are assigned.

This makes it possible to position dedicated transmission terminals on the network in response to the needs of data deliverers, thus reducing traffic on the network during data delivery and permitting stable data transfer.

(11) It is possible to modify the network positioning system and the devices included therein by any combination of the above embodiments and the structures described in the Supplementary Explanation. For example, the terminal positioning device 150*a* described in Embodiment 2 may be replaced by the terminal positioning device 150 described in Embodiments 3 and 4.

(12) In the above Embodiments, the path search target device 100, the terminal positioning device 150 and 150*a*, the delivery management device 200, the data providing device 250, the dedicated transmission terminal management device 280, etc. are each described as separate devices, but the present invention is not limited in this way. All of the devices described in the above Embodiments and Supplementary Explanation (the path search target device, the terminal positioning device, the delivery management device, the data providing device, the dedicated transmission terminal management device, etc.) may be implemented as one device, or devices may be grouped in any number of combinations and implemented as a plurality of devices.

(13) In the above Embodiments, the number of levels in the network and the number of sub-networks in the network are simply examples. As long as the network has at least two levels, neither the number of levels in the network nor the number of sub-networks is limited in any particular way.

The present invention may be used in a system for positioning terminals in a network.

REFERENCE SIGNS LIST

1 network positioning system
100 path search target device
150, 150*a* terminal positioning device
151 path information reception unit
152 path information storage unit
153 path information table
154 terminal position information creation unit 155, 155a terminal position information storage unit
156, 156a terminal position information transmission unit
161 inter-terminal path information requesting unit
162 inter-terminal path information reception unit
163 inter-terminal path information storage unit
164 inter-terminal path information table
165 terminal position information adjustment unit
200, 200A, 200B delivery management device
201 terminal position information reception unit
202 terminal position information storage unit
203 terminal position information storage unit
204 data list reception unit
205 data list storage unit
206 data list table
207 transmission terminal notification request reception unit
208 transmission terminal selection unit
209 transmission terminal notification unit
250, 250A, 250B data providing device
280 dedicated transmission terminal management device
300 network
500 terminal group
501-506 terminal

The invention claimed is:

1. A network positioning system comprising a plurality of terminals, a terminal positioning device, and a path search target device, the terminal positioning device being configured to position the terminals in a network, a plurality of sub-networks being connected hierarchically in the network and each having an intermediary device, and the path search target device being connected to any of the intermediary devices, wherein
the terminal positioning device includes:
a path information reception unit configured to receive, from each terminal, path information listing intermediary device identifiers that identify each intermediary device in the network on a path from the corresponding terminal to the path search target device; and
a terminal position information creation unit configured to create, based on the path information received from each terminal, terminal position information indicating communication paths between the terminals, the terminal position information also representing connections between the intermediary devices and connections between the intermediary devices and the terminals;
an inter-terminal path information acquisition unit configured to (i) specify, within the terminal position information created by the terminal position information creation unit, one or more terminals connected to the same intermediary device as a terminal group, (ii) acquire, for each terminal group, inter-terminal path information listing intermediary device identifiers that identify each intermediary device on a path from a terminal to another terminal in the same terminal group, and (iii) acquire, for each combination of different terminal groups, inter-terminal path information listing intermediary device identifiers that identify each intermediary device on a path from a terminal to another terminal respectively included in the different terminal groups; and
a terminal position information adjustment unit configured to adjust terminal position information created by the terminal position information creation unit in accordance with the inter-terminal path information by removing, from the terminal position information, an intermediary device identifier identifying an intermediary device that does not transfer data by returning the data.

2. The network positioning system of claim 1, further comprising:
a delivery management device configured to select, from among the terminals, based on the terminal position information created by the terminal position information creation unit, a transmission terminal to transmit data or a reception terminal to receive data when data is to be transmitted between any of the terminals.

3. The network positioning system of claim 2, wherein
the delivery management device selects a terminal located close in the network to a terminal attempting to receive data as the transmission terminal or selects a terminal located close in the network to a terminal attempting to transmit data as the reception terminal.

4. The network positioning system of claim 2, wherein
the delivery management device selects a terminal located far in the network from a terminal attempting to receive data as the transmission terminal or selects a terminal located far in the network from a terminal attempting to transmit data as the reception terminal.

5. The network positioning system of claim 2, wherein
the delivery management device includes:
a data list storage unit for storing a data list listing one or more data identifiers that each identify a piece of data stored by the terminals;
a transmission terminal selection unit configured to select, based on the terminal position information created by the terminal position information creation unit and the data list stored by the data list storage unit, the transmission terminal from among terminals in the network that store data a terminal is attempting to receive; and
a transmission terminal notification unit configured to notify the terminal attempting to receive data of the transmission terminal selected by the transmission terminal selection unit.

6. The network positioning system of claim 2, further comprising:
a data providing device configured to initially provide data to one or more terminals among the plurality of terminals.

7. The network positioning system of claim 2, further comprising:
a data providing device configured to provide data to a terminal in the network attempting to receive the data.

8. The network positioning system of claim 2, further comprising:
one or more dedicated transmission terminals other than the plurality of terminals and configured only to transmit data; and
a terminal management device configured to manage an operational status of the dedicated transmission terminals.

9. The network positioning system of claim 8, wherein
the terminal management device causes the dedicated transmission terminals to operate continually.

10. The network positioning system of claim 8, wherein
the terminal management device causes the dedicated transmission terminals to operate in accordance with time management.

11. The network positioning system of claim 8, wherein
the terminal management device causes the dedicated transmission terminals to operate in accordance with a data transfer load.

12. The network positioning system of claim 8, wherein
the dedicated transmission terminals transmit data in accordance with a data delivery method.

13. A terminal positioning device for positioning a plurality of terminals connected to a network, a plurality of sub-networks being connected hierarchically in the network and each having an intermediary device, and a path search target device being connected to any of the intermediary devices, the terminal positioning device comprising:

a path information reception unit configured to receive, from each terminal, path information listing intermediary device identifiers that identify each intermediary device in the network on a path from the corresponding terminal to the path search target device;

a terminal position information creation unit configured to create, based on the path information received from each terminal, terminal position information indicating communication paths between the terminals, the terminal position information also representing connections between the intermediary devices and connections between the intermediary devices and the terminals;

an inter-terminal path information acquisition unit configured to (i) specify, in the terminal position information created by the terminal position information creation unit, one or more terminals connected to the same intermediary device as a terminal group, (ii) acquire, for each terminal group, inter-terminal path information listing intermediary device identifiers that identify each intermediary device on a path from a terminal to another terminal in the same terminal group, and (iii) acquire, for each combination of different terminal groups, inter-terminal path information listing intermediary device identifiers that identify each intermediary device on a path from a terminal to another terminal respectively included in the different terminal groups; and a terminal position information adjustment unit configured to adjust terminal position information created by the terminal position information creation unit in accordance with the inter-terminal path information, acquired by the inter-terminal path information acquisition unit, by removing, from the terminal position information, an intermediary device identifier identifying an intermediary device that does not transfer data by returning the data.

\* \* \* \* \*